US008877377B2

(12) United States Patent
Hosoya

(10) Patent No.: US 8,877,377 B2
(45) Date of Patent: Nov. 4, 2014

(54) CATHODE ACTIVE MATERIAL, CATHODE, AND NON-AQUEOUS ELECTROLYTE SECONDARY BATTERY

(75) Inventor: Yosuke Hosoya, Fukushima (JP)

(73) Assignee: Sony Corporation, Tokyo (JP)

( * ) Notice: Subject to any disclaimer, the term of this patent is extended or adjusted under 35 U.S.C. 154(b) by 924 days.

(21) Appl. No.: 12/248,588

(22) Filed: Oct. 9, 2008

(65) Prior Publication Data

US 2009/0104532 A1    Apr. 23, 2009

(30) Foreign Application Priority Data

Oct. 19, 2007    (JP) .................... 2007-272929

(51) Int. Cl.
| | | |
|---|---|---|
| H01M 4/13 | (2010.01) | |
| H01M 4/58 | (2010.01) | |
| H01M 4/36 | (2006.01) | |
| H01M 4/485 | (2010.01) | |

(52) U.S. Cl.
CPC .............. *H01M 4/485* (2013.01); *H01M 4/582* (2013.01); *Y02E 60/122* (2013.01); *H01M 4/366* (2013.01)
USPC ...................................................... 429/218.1

(58) Field of Classification Search
USPC .............. 429/231.95, 231.5, 231.6, 221, 224, 429/218.1; 424/464
See application file for complete search history.

(56) References Cited

U.S. PATENT DOCUMENTS

| | | | |
|---|---|---|---|
| 6,372,385 B1 | 4/2002 | Kweon et al. | |
| 6,653,021 B2 | 11/2003 | Kweon et al. | |
| 6,984,469 B2 | 1/2006 | Kweon et al. | |
| 7,235,193 B2 | 6/2007 | Park et al. | |
| 2002/0071991 A1* | 6/2002 | Kweon et al. ............... | 429/231.1 |
| 2002/0076613 A1 | 6/2002 | Lee et al. | |
| 2004/0091779 A1* | 5/2004 | Kang et al. .................. | 429/231.1 |
| 2005/0019662 A1* | 1/2005 | Suhara et al. ............ | 429/231.95 |
| 2006/0071198 A1* | 4/2006 | Paulsen et al. ................ | 252/500 |
| 2006/0275667 A1* | 12/2006 | Watanabe et al. .......... | 429/231.3 |
| 2007/0122705 A1* | 5/2007 | Paulsen et al. ............. | 429/231.3 |
| 2008/0138708 A1* | 6/2008 | Watanabe et al. ............. | 429/220 |
| 2008/0160410 A1* | 7/2008 | Sun et al. ....................... | 429/220 |
| 2008/0193834 A1* | 8/2008 | Murakami et al. ............ | 429/129 |

FOREIGN PATENT DOCUMENTS

| | | |
|---|---|---|
| JP | 07-235292 | 9/1995 |
| JP | 08-213014 | 8/1996 |
| JP | 08-264183 | 10/1996 |

(Continued)

OTHER PUBLICATIONS

Makhonina et al., Russian Chemical Reviews, 73(10)991-1001(2004).*
JP 2000-128539 (machine translation).*
Japanese Office Action for corresponding JP2007-272929 issued on Jan. 12, 2010.

*Primary Examiner* — Patrick Ryan
*Assistant Examiner* — Alex Usyatinsky
(74) *Attorney, Agent, or Firm* — K&L Gates LLP

(57) ABSTRACT

A cathode active material has: a composite oxide particle containing at least lithium and one or a plurality of transition metals; and a coating layer provided on at least a part of the composite oxide particle. The coating layer contains at least one kind of element M differing from a main transition metal element A forming the composite oxide particle and selected from Groups 2 to 16 of the periodic table and a halogen element X. In the coating layer, the element M and the halogen element X exhibit different distribution states.

14 Claims, 7 Drawing Sheets

(56) References Cited

FOREIGN PATENT DOCUMENTS

| | | |
|---|---|---|
| JP | 2000-149950 | 5/2000 |
| JP | 2000-156227 | 6/2000 |
| JP | 2000-164214 | 6/2000 |
| JP | 2000-195517 | 7/2000 |
| JP | 3141858 | 12/2000 |
| JP | 3157413 | 2/2001 |
| JP | 3172388 | 3/2001 |
| JP | 2001-256979 | 9/2001 |
| JP | 2002-164053 | 6/2002 |
| JP | 2002-231227 | 8/2002 |
| JP | 2003-221235 | 8/2003 |
| JP | 2003-229129 | 8/2003 |
| JP | 3691279 | 6/2005 |
| JP | 2005-225734 | 8/2005 |
| JP | 2005-524204 | 11/2005 |
| JP | 2006-331941 | 12/2006 |
| JP | 2007-103119 | 4/2007 |
| WO | WO03-069702 | 8/2003 |

* cited by examiner

CATHODE ACTIVE MATERIAL, CATHODE, AND NON-AQUEOUS ELECTROLYTE SECONDARY BATTERY

CROSS REFERENCES TO RELATED APPLICATIONS

The present application claims priority to Japanese Patent Application JP 2007-272929 filed in the Japanese Patent Office on Oct. 19, 2007, the entire contents of which is being incorporated herein by reference.

BACKGROUND

The present application relates to a cathode active material, a cathode, and a non-aqueous electrolyte secondary battery and, more particularly, to a cathode active material containing a composite oxide containing, for example, lithium and a transition metal, a cathode, and a non-aqueous electrolyte secondary battery.

In recent years, techniques of portable electronic apparatuses have remarkably been developed and electronic apparatuses such as cellular phones, notebook-sized computers, and the like have been started to be recognized as fundamental techniques which support the advanced information world. Researches and developments regarding the realization of advanced functions of those electronic apparatuses are vigorously being progressed. Electric power consumption of those electronic apparatuses is also increasing more and more in proportion to the realization of the advanced functions. On the contrary, it is demanded that those electronic apparatuses can be driven for a long time and it is inevitably demanded to realize a high energy density of a secondary battery as a driving power source. It is also demanded to extend a cycle life in consideration of an environment.

The higher energy density of the battery is desirable from viewpoints of an occupied volume, a mass, and the like of the battery built in the electronic apparatus. At present, lithium ion secondary batteries have been built in most of the apparatuses because they have higher voltages and higher energy densities than those of other battery systems.

Ordinarily, in the lithium ion secondary battery, a lithium cobalt acid is used for a cathode, a carbon material is used for an anode, and an operating voltage is set to a value within a range from 4.2V to 2.5V. In a unit cell, a terminal voltage can be raised to 4.2V owing to an excellent electrochemical stability of a non-aqueous electrolyte material, a separator, and the like.

Many examinations are being progressed in order to realize further advanced performance and an enlargement of application of such a lithium ion secondary battery. As one of the examinations, for example, it is being examined to raise an energy density of a cathode active material including the lithium cobalt acid by a method of raising a charge voltage or the like, thereby realizing a large capacitance of the lithium ion secondary battery.

However, there is such a problem that when the charge and discharge are repeated at a large capacitance, a capacitance deterioration occurs and a battery life is shortened. There is also such a problem that when the battery is used under a high temperature environment, an increase in internal resistance of the battery progresses, it is difficult to extract a sufficient battery capacitance, or the like. Therefore, hitherto, a method of reforming the cathode active material by mixing a small amount of $LiMn_{1/3}Co_{1/3}Ni_{1/3}O_2$ or the like to the cathode active material and using such a material or by coating the surface with another material has been used.

For example, a method of improving cycle characteristics by coating the surface of a cathode electrode with a metal oxide has been disclosed in Patent Document 1 (Japanese Patent No. 3172388). A method of raising a thermal stability by coating the surface of a cathode active material with a metal oxide has been disclosed in Patent Document 2 (Japanese Patent No. 3691279).

Upon coating of the surface of the cathode active material, effects of improving the cycle characteristics and improving the thermal stability by the coating form have also been examined. For example, methods of uniformly coating a lithium transition metal composite oxide have been disclosed in Patent Document 3 (JP-A-7-235292), Patent Document 4 (JP-A-2000-149950), Patent Document 5 (JP-A-2000-156227), Patent Document 6 (JP-A-2000-164214), Patent Document 7 (JP-A-2000-195517), and Patent Document 8 (JP-A-2002-231227). A cathode active material in which a lump of a metal oxide has been deposited on a metal oxide layer has been disclosed in Patent Document 9 (JP-A-2001-256979).

Elements which are used to coat the surface have also been examined. For example, a cathode active material in which one or more surface processing layers containing two or more coating elements have been formed on the surface of a lithium compound serving as a core has been disclosed in Patent Document 10 (JP-A-2002-164053).

A cathode active material in which a coating film made of metal fluoride has been formed on the particle surface has been disclosed in Patent Document 11 (Japanese Patent No. 3157413). A cathode active material in which the particle surface has been coated with crystalline metal fluoride has been disclosed in Patent Document 12 (Japanese Patent No. 3141858).

Further, a technique of specifying an XPS (X-ray Photoelectron Spectroscopy) energy value of fluorine on the particle surface has been disclosed in Patent Document 13 (JP-A-2003-221235).

SUMMARY

However, according to the coating elements, coating methods, and coating forms disclosed in Patent Documents 1 and 2 mentioned above, since a diffusion of lithium ions is obstructed, there is such a drawback that it is difficult to obtain a sufficient capacitance in the case of a value of a charge/discharge current in a working area.

According to the methods disclosed in Patent Documents 3, 4, 5, 6, 7, and 8 mentioned above, although the large capacitance can be maintained, it is insufficient to highly improve the cycle characteristics and further suppress the gas generation. The cathode active material having a structure in which the lump of the metal oxide has been deposited on the metal oxide layer was formed by the method disclosed in Patent Document 9, so that it is difficult to obtain sufficient charge/discharge efficiency and the capacitance decreases largely.

According to Patent Document 10 mentioned above, nothing is specified with respect to distribution on the particle surface of the lithium compound serving as a core and its effect is limited to the improvement of the thermal stability.

According to the cathode active materials disclosed in Patent Documents 11 and 12 mentioned above, if the particle surface is merely coated with the metal fluoride having low electron conductivity or low lithium ion conductivity, charge/discharge performance deteriorates remarkably and an effect to charge/discharge characteristics under the high temperature environment is also insufficient.

Further, according to Patent Document 13 mentioned above, the present inventors have formed the cathode active material by the method of mixing and heating the metal fluoride as disclosed in Patent Document 13, so that although the effect to high temperature holding characteristics could actually be obtained, it is insufficient to the actual use performance. Particularly, such an effect is not obtained either in an area of a high charge voltage.

Although the cycle characteristics or thermal stability can be improved to a certain degree by reforming the cathode active material as mentioned above, the battery capacitance is liable to decrease. The degree of improvement of the battery characteristics which is obtained by the foregoing methods is not sufficient. A further improvement is demanded with respect to an increase in resistance in the battery that is caused under the high temperature environment.

It is, therefore, desirable to provide a cathode active material, a cathode, and a non-aqueous electrolyte secondary battery in which a large capacitance and excellent charge/discharge cycle characteristics are obtained and an increase in internal resistance can be suppressed.

According to an embodiment, there is provided a cathode active material including: a composite oxide particle containing at least lithium and one or a plurality of transition metals; and a coating layer provided on at least a part of the composite oxide particle, wherein the coating layer contains at least one kind of element M differing from a main transition metal element A forming the composite oxide particle and selected from Groups 2 to 16 of the periodic table and a halogen element X, and in the coating layer, the element M and the halogen element X exhibit different distribution states.

In the coating layer of the cathode active material, it is preferable that the element M is distributed more uniformly than the halogen element X. In the coating layer of the cathode active material, it is also preferable that at least a part of the halogen element X exists in a form of a halide of an element M' different from the element M. Further, it is preferable that the halide of the element M' contains at least lithium fluoride LiF.

It is also preferable that the composite oxide particle has a stratified rock-salt structure and the main transition metal element A substantially forming the composite oxide particle contains at least cobalt Co.

It is preferable that element compositions on the surface of the composite oxide particle lie within a range of $0.03 < A/(M+M'+X+A) < 0.8$ as an atom ratio. It is also preferable that element compositions lie within a range of $0 < M/(A+M) < 0.1$ as an atom ratio.

It is preferable that the element M contains at least one kind of element selected from manganese Mn, aluminum Al, magnesium Mg, bismuth Bi, molybdenum Mo, and yttrium Y.

According to another embodiment, there is provided a cathode including: a conductive base material; and a cathode active material layer which is formed on the conductive base material and contains at least a cathode active material, wherein a composite oxide particle containing at least lithium and one or a plurality of transition metals and a coating layer provided on at least a part of the composite oxide particle are provided in at least a part of the cathode active material, the coating layer contains at least one kind of element M differing from a main transition metal element forming the composite oxide particle and selected from Groups 2 to 16 of the periodic table and a halogen element X, and in the coating layer, a material in which the element M and the halogen element X exhibit different distribution states is used.

According to still another embodiment, there is provided a non-aqueous electrolyte secondary battery including: a cathode having a cathode active material; an anode; a separator; and an electrolyte, wherein a composite oxide particle containing at least lithium and one or a plurality of transition metals and a coating layer provided on at least a part of the composite oxide particle are provided in at least a part of the cathode active material, the coating layer contains at least one kind of element M differing from a main transition metal element forming the composite oxide particle and selected from Groups 2 to 16 of the periodic table and a halogen element X, and in the coating layer, a material in which the element M and the halogen element X exhibit different distribution states is used.

According to an embodiment, the cathode active material, cathode, and non-aqueous electrolyte secondary battery in which excellent charge/discharge cycle characteristics are obtained and an increase in internal resistance can be suppressed can be obtained.

Additional features and advantages are described herein, and will be apparent from the following Detailed Description and the figures.

DETAILED DESCRIPTION

Figure 1:
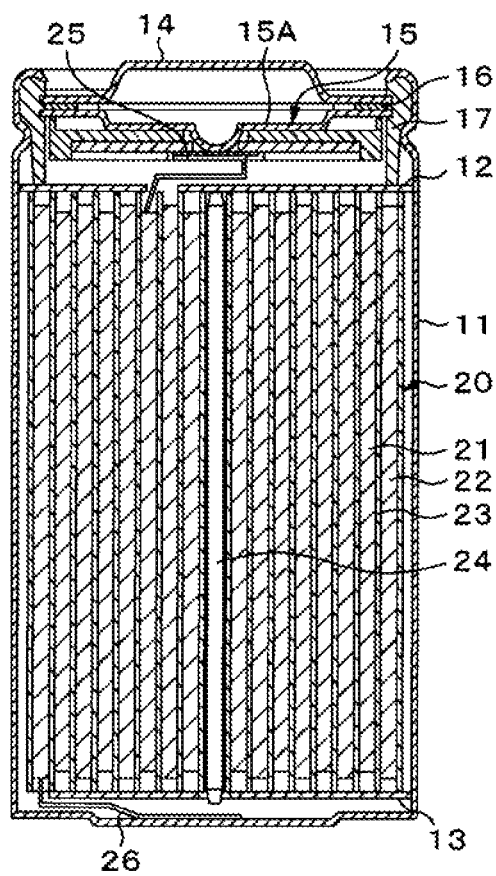
FIG. 1 is a cross sectional view illustrating a construction of a battery according to a first embodiment.

Embodiments will be described hereinbelow with reference to the drawings. A non-aqueous electrolyte secondary battery is referred to as a secondary battery hereinbelow.

(1) First Embodiment (1-1) Cathode Active Material

According to a cathode active material which is used in a secondary battery of the first embodiment, a coating layer contains a halogen element X and at least one kind of element M selected from Groups 2 to 16 of the periodic table and differing from a main transition metal element contained in a composite oxide particle serving as a mother particle is provided on at least a part of the composite oxide particle, and the element M and the halogen element X exhibit different distribution states in the coating layer.

[Composite Oxide Particle]

The composite oxide particle serving as a mother particle is a lithium-contained transition metal oxide containing at least lithium Li and one or a plurality of transition metals and is not particularly limited so long as it can dope and dedope lithium. However, a lithium-contained transition metal oxide having a structure of a stratified rock-salt type such as lithium cobalt acid $LiCoO_2$ or lithium nickel acid $LiNiO_2$ is preferable from a viewpoint of realization of the large capacitance. $LiNi_yCo_{1-y}O_2$ (in the formula, 0<y<1) or the like as a solid solution in which a part of a transition metal element has been substituted by another element can be also used. $LiNi_{0.5}CO_{0.5}O_2$, $LiNi_{0.8}CO_{0.2}O_2$, or the like can be mentioned as an example. It is preferable to use at least cobalt Co as a transition metal. This is because the lithium-contained transition metal oxide mainly containing lithium cobalt acid has high filling performance and high discharge voltage. The lithium-contained transition metal oxide mainly containing lithium cobalt acid may be an oxide obtained by executing such a well-known technique that a part of it is substituted by at least one or more elements selected from Groups 2 to 15 of the periodic table, physical properties of fine particles are adjusted, or the like.

Specifically speaking, it is preferable to use a lithium-contained transition metal oxide having compositions shown by Formula 1.

$$Li_pCo_{(1-q)}M_qO_{(2-r)}X_z \qquad \text{(Formula 1)}$$

(In the formula, M denotes at least one kind of element selected from Groups 2 to 15 of the periodic table excluding cobalt Co; X indicates at least one kind of elements of Group 16 and elements of Group 17 other than oxygen O; and p, q, r, and z indicate values within ranges of $0 \leq p \leq 1.2$, $0 \leq q \leq 0.3$, $-0.10 \leq r \leq 0.20$, and $0 \leq z \leq 0.1$)

The main transition metal element forming the composite oxide particle denotes a transition metal of the largest ratio among the transition metals forming the composite oxide particle. For example, in the case of the composite oxide particle whose mean compositions are $LiCu_{0.98}Al_{0.01}Mg_{0.01}O_2$, the main transition metal element indicates cobalt Co.

[Coating Layer]

The coating layer is provided on at least a part of the composite oxide particle and contains a halogen element X and at least one kind of element M differing from the main transition metal element substantially forming the transition metals contained in the composite oxide particle and selected from Groups 2 to 16 of the periodic table.

The coating layer is a layer which has composition elements or a composition ratio different from those/that of the composite oxide particle and with which at least a part of the composite oxide particle surface is coated. The coating layer is a layer which is formed by distributing the element M and the halogen element X onto the composite oxide particle surface. The coating layer is an area where the composition ratio of the element M and the halogen element X in the coating layer is higher than that of the element M and the halogen element X in the composite oxide particle.

Different from a coating layer having a simple construction in which distribution states of a plurality of elements contained in the coating layer are identical like a coating layer in the related art, the element M and the halogen element X contained in the coating layer have different distribution states in the coating layer. Specifically speaking, it is preferable that there is a difference of uniformity of the distribution between the element M and the halogen element X and the element M is more uniformly distributed on the composite oxide particle surface than the halogen element X. It is also preferable that a larger amount of element M than that of the halogen element X is distributed on the composite oxide particle surface. Such distribution states of the element M and the halogen element X can be confirmed by a method whereby, for example, the composite oxide particle having the coating layer is observed by an SEM (Scanning Electron Microscope) having an EDX (Energy Dispersive X-ray analyzer) (hereinbelow, referred to as SEM/EDX). The distribution states can be also confirmed by a method whereby the surface or cross section of the composite oxide particle is analyzed by a TOF-SIMS (Time of Flight Secondary Ion Mass Spectrometry) and ions containing the elements M and X are measured.

It is preferable that the element M is almost uniformly distributed onto the composite oxide particle surface and the coating layer is formed. This is because since the composite oxide particle surface is coated with the coating layer containing the element M, an elution of the main transition metal element contained in the composite oxide particle can be suppressed, a reaction to an electrolytic solution can be suppressed, and a deterioration in battery characteristics can be suppressed.

As such an element M, an element of Groups 2 to 16 of the periodic table in which a substitution, addition, coating, and the like have been performed to the lithium cobalt acid used for the cathode active material in the related art can be used.

As an element M, it is preferable that at least one kind of element selected from manganese Mn, aluminum Al, magnesium Mg, bismuth Bi, molybdenum Mo, and yttrium Y is contained. In the cathode active material having the composite oxide particle and the coating layer, it is preferable that the element compositions of the element M contained in the composite oxide particle satisfies a relation of $0<M/(A+M)<0.1$. This is because although the element M contributes to stabilization of the active material, if its ratio is equal to or larger than 0.1, an amount of elements M which does not contribute to the battery capacitance and the capacitance decrease of the cathode active material itself increases.

On the other hand, it is preferable that the halogen element X is dotted and distributed on the composite oxide particle surface, thereby forming the coating layer. This is because an obstruction to the doping/dedoping of lithium by the coating layer containing the halogen element X can be suppressed. For example, the halogen element X may be unevenly distributed on the composite oxide particle surface or can be also dotted and distributed at a plurality of points on the whole surface. The halogen element X may be dotted and distributed on the coating layer containing the element M.

It is preferable that the halogen element X is dotted and distributed on the surface in a state of a halide expressed by $M'_aX_b$ represented by, for example, LiF. This is because since X used as a coating material exists as $M'_aX_b$ on the composite oxide particle surface, surplus elements M' existing in the composite oxide particle are stabilized and the battery characteristics can be improved. For example, it is considered that since a surplus lithium Li compound such as lithium hydroxide LiOH or lithium carbonate $Li_2CO_3$ causes a gas generation and becomes a cause of deterioration of the battery characteristics, by stabilizing the halogen element as a halide, the battery characteristics can be improved. According to the halide represented by LiF, lithium ion conductivity is low and, if the composite oxide particle surface is perfectly coated with the halide, such a halide becomes an obstacle to the doping/dedoping of lithium. However, since the halide exists in a state where it is dotted and distributed on the composite oxide particle surface as mentioned above, both of the realization of the large capacitance and the suppression of the gas generation can be satisfied. It is preferable that the compound expressed by $M'_aX_b$ is crystalline. This is because by crystallizing $M'_aX_b$, the state where the halide is dotted and distributed on the particle surface is promoted.

It is preferable that the element M' is an element different from the element M. This is because since it is preferable that the element M is uniformly distributed on the composite oxide particle surface as much as possible, if the element M is dotted and distributed together with the halogen element X, the effect of improving the battery characteristics decreases.

In the cathode active material surface formed as mentioned above, it is much preferable that the element M, element M', halogen element X, and main transition metal element A exist so that their element compositions lie within a range of $0.03<A/(M+M'+X+A)<0.8$. This is because if an existence ratio of A is equal to or larger than 0.8, the effect of improving the cycle characteristics and the effect of suppressing an increase in internal resistance owing to the coating layer containing the element M decrease. If the existence ratio of A is equal to or less than 0.03, an existence ratio of element other than A in which a lithium ion permeability is low increases relatively, and although the effect of improving the cycle characteristics and the effect of suppressing the increase in internal resistance can be obtained, the battery capacitance decreases.

An element ratio of Co, halogen element X, element M, and element M' on the cathode active material surface can be measured by using an ESCA (Scanning X-ray Photoelectron spectroscope: made by ULVAC-PHI Inc.; QuanteraSXM). Specifically speaking, a particle sample to be measured is embedded into a metal indium piece, the sample piece is fixed onto a sample stage by a plate spring, and a measurement is performed. A monochromatic Al—Kα beam (1486.6 eV) is used as an X-ray source and the surface of the measurement sample can be measured by using an argon ion gun and an electron neutralizing gun while correcting the charging in an automatic mode.

In the manufactured cathode active material, at least lithium fluoride LiF is contained in the halide existing in the coating layer. This is because even in the case where lithium Li is not used as an element M' of the halide forming the coating layer, lithium Li in the composite oxide particle such as lithium cobalt acid $LiCoO_2$ or the like is solved into the coating layer.

It is preferable that a mean diameter of the cathode active material lies within a range from 2.0 μm or more to 50 μm or less. This is because if the mean diameter is less than 2.0 μm, when the cathode is manufactured, the cathode active material is liable to be peeled off from a cathode collector in a pressing step and a surface area of the cathode active material increases and, therefore, an addition amount of a conductive material, a binder, or the like has to be increased, and an energy density per unit mass decreases. On the contrary, it is because if the mean diameter exceeds 50 μm, a possibility that the cathode active material pierces a separator and a short-circuit is caused rises.

By using such a cathode active material, the large capacitance and the improvement of the charge/discharge cycle characteristics of the secondary battery are realized and the gas generation in the battery can be suppressed. Although its improvement reason for such effects is obscure, it is presumed that such effects are derived by the following mechanism.

The composite oxide particle as well as, for example, lithium cobalt acid $LiCoO_2$ or lithium nickel acid $LiNiO_2$ is used as a cathode active material and, in a state where a cathode/anode ratio is properly designed, a charge is executed so that an upper charge voltage is equal to 4.20V, preferably, 4.35V or more, and much preferably, 4.40V or more. Thus, an energy density of the secondary battery can be improved. However, in the battery charged to 4.20V or more, since the cathode active material generates a high electromotive force, an electrolyte which is come into contact with the cathode active material is in a strong oxidation environment. It is, thus, considered that metal components are eluted from the cathode active material which has become unstable because a larger amount of lithium was dedoped and the cathode active material is deteriorated, or the metal components eluted from the cathode active material are reduction precipitated to the anode side, so that the anode surface is covered therewith, and the doping/dedoping of lithium is obstructed. It is also considered that since reactivity at an interface between the cathode active material and an electrolytic solution rises, oxidation decomposition of the electrolytic solution at the interface occurs, and a deterioration of an electrolyte is accelerated. It is also considered that since the electrolyte is oxidation decomposed on the cathode, a gas is generated and a coating film is formed on the cathode, so that the battery expands or an impedance rises. It is presumed that since the deterioration of the cathode active material and the electrolytic solution occur upon charging, the deterioration of the charge/discharge cycle characteristics or the generation of the gas in the battery occurs.

On the other hand, according to the cathode active material which is used for the secondary battery of the first embodiment, it is considered that since the coating layer containing the element M is provided on the composite oxide particle surface, the elution of the main transition metal element contained in the composite oxide particle is suppressed and the deterioration of the cycle characteristics is suppressed. It is also considered that since the halogen element X is contained in the coating layer, the halogen element X reacts to impurities (for example, surplus lithium Li compound such as LiOH or $Li_2CO_3$) on the composite oxide particle surface and stabilizes the cathode active material or the like, thereby suppressing the gas generation, and that since the distribution of the halogen element X in the coating layer is smaller than that of the element M and does not obstruct the doping/dedoping of lithium, the halogen element X contributes to both of the realization of the large capacitance and the improvement of the cycle characteristics.

(1-2) Construction of Secondary Battery

FIG. 1 shows a cross sectional structure of a secondary battery according to the first embodiment. The secondary battery is, for example, a non-aqueous electrolyte secondary battery and is what is called a lithium ion secondary battery in which lithium Li is used as an electrode reactive substance and a capacitance of an anode is expressed by a capacitance component due to the doping/dedoping of lithium Li.

The battery is what is called a cylindrical type. A winded electrode member 20 in which a pair of belt-shaped cathode 21 and belt-shaped anode 22 have been wound through a separator 23 is provided in an almost hollow cylindrical battery can 11. The battery can 11 is made of iron Fe plated with, for example, nickel Ni. One end portion of the battery can 11 is closed and the other end portion is opened. A pair of insulating plates 12 and 13 are arranged in the battery can 11 perpendicularly to the winded circumferential surface so as to sandwich the winded electrode member 20, respectively.

A battery cap 14 and a relief valve mechanism 15 and a thermally-sensitive resistive element (Positive Temperature Coefficient; PTC element) 16 provided in the battery cap 14 are caulked through a gasket 17 and attached to an open end portion of the battery can 11. The inside of the battery can 11 is sealed.

The battery cap 14 is made of, for example, a material similar to that of the battery can 11. The relief valve mechanism 15 is electrically connected to the battery cap 14 through the PTC element 16. When an internal pressure of the battery rises to a predetermined value or more due to an internal short-circuit, heating from an outside, or the like, a disk plate 15A is reversed, thereby disconnecting the electrical connection between the battery cap 14 and the winded electrode member 20. When a temperature rises, the PTC element 16 limits a current by an increase in resistance value, thereby preventing abnormal heat generation caused by a large current. The gasket 17 is made of, for example, an insulating material and its surface is coated with asphalt.

For example, a center pin 24 has been inserted at the center of the winded electrode member 20. A cathode lead 25 made of aluminum Al or the like is connected to the cathode 21 of the winded electrode member 20. An anode lead 26 made of nickel Ni or the like is connected to the anode 22. The cathode lead 25 is electrically connected to the battery cap 14 by being welded to the relief valve mechanism 15. The anode lead 26 is welded and electrically connected to the battery can 11.

[Cathode]

Figure 2:
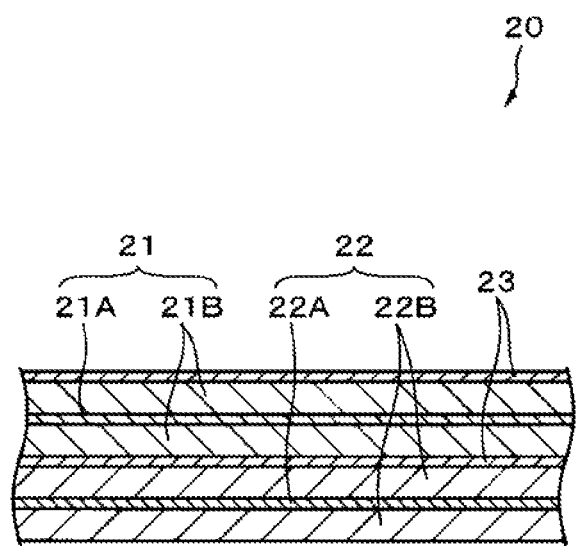
FIG. 2 is a cross sectional view enlargedly showing a part of a winded electrode member enclosed in the battery according to a first embodiment.

FIG. 2 is a cross sectional view enlargedly showing a part of the winded electrode member 20 shown in FIG. 1. The cathode 21 has a structure in which, for example, cathode active material layers 21B are provided on both surfaces of a cathode collector 21A having a pair of opposite surfaces. Although not shown, a region where the cathode active material layer 21B exists only on one surface of the cathode collector 21A may be provided. The cathode collector 21A is made of, for example, metal foil such as aluminum Al foil. The cathode active material layer 21B contains, for example, the cathode active material as mentioned above and is formed so as to contain a conductive material such as carbon black, graphite, or the like and a binder such as polyvinylidene fluoride PVdF or the like as necessary.

[Anode]

As shown in FIG. 2, the anode 22 has, for example: an anode collector 22A having a pair of opposite surfaces; and anode active material layers 22B provided on both surfaces or an anode active material layer 22B provided on one surface of the anode collector 22A. The anode 22 may have a region where the anode active material layer 22B is formed only on one surface of the anode collector 22A. The anode collector 22A is made of, for example, metal foil such as copper Cu foil or the like.

The anode active material layer 22B contains, for example, an anode active material and may contain another material such as conductive material, binder, viscosity adjusting agent, or the like which does not contribute to the charge as necessary. As a conductive material, a graphite fiber, a metal fiber, a metal powder, or the like can be mentioned. As a binder, a fluorine system high molecular compound such as polyvinylidene fluoride PVdF or the like, synthetic rubber such as styrene butadiene rubber SBR or ethylene propylene dien rubber EPDR, or the like can be mentioned. As a viscosity adjusting agent, carboxymethyl cellulose CMC or the like can be mentioned.

The anode active material is made by containing one, two, or more kinds of anode materials which can electro-chemically dope and dedope lithium Li at an electric potential of 2.0V or less against lithium metal.

As anode materials which can dope and dedope lithium Li, for example, a carbon material, a metal compound, an oxide, a sulfide, a lithium nitride such as $LiN_3$ or the like, a lithium metal, a metal which forms an alloy together with lithium, a high molecular material, or the like can be mentioned.

As a carbon material, for example, a non-easy-graphitizable carbon, an easy-graphitizable carbon, a graphite, a pyrolytic carbon class, a coke class, a glassy carbon class, an organic high molecular compound baked material, a carbon fiber, or an activated charcoal can be mentioned. Among them, as a coke class, there is a pitch coke, a needle coke, a petroleum coke, or the like. The organic high molecular compound baked material is a material carbonated by baking a high molecular material such as phenol resin, fran resin, or the like at a proper temperature. As a part of the organic high molecular compound baked material, there is a material classified into the non-easy-graphitizable carbon or easy-graphitizable carbon. As a high molecular material, polyacetylene, polypyrrole, or the like can be mentioned.

Among such anode materials which can dope and dedope lithium Li, an anode material whose charge/discharge electric potential is relatively close to that of the lithium metal is preferable. This is because the lower the charge/discharge electric potential of the anode 22 is, the easier the high energy density of the battery can be realized. Among them, the carbon material is preferable because a change in crystal structure that is caused upon charging/discharging is very small, a large charge/discharge capacitance can be obtained, and good cycle characteristics can be obtained. Particularly, the graphite is preferable because an electrochemical equivalent is large and the high energy density can be obtained. The non-easy-graphitizable carbon is preferable because the excellent cycle characteristics can be obtained.

As anode materials which can dope and dedope lithium Li, a lithium metal simple substance or a simple substance, an alloy, or a compound of a metal element or semimetal element which can form an alloy together with lithium Li can be mentioned. Those anode materials are preferable because the high energy density can be obtained. Particularly, if such anode materials are used together with the carbon material, since the high energy density can be obtained and the excellent cycle characteristics can be obtained, it is much preferable. In the specification, in addition to an alloy made of two or more kinds of metal elements, an alloy made of one or more kinds of metal elements and one or more kinds of semimetal elements is also incorporated in the alloy. As a texture of the alloy, there is a solid solution, an eutectic (eutectic mixture), an intermetallic compound, or an alloy in which two or more kinds of them coexist.

As such a metal element or semimetal element, for example, the following element can be mentioned: tin Sn, lead Pb, aluminum Al, indium In, silicon Si, zinc Zn, antimony Sb, bismuth Bi, cadmium Cd, magnesium Mg, boron B, gallium Ga, germanium Ge, arsenic As, silver Ag, zirconium Zr, yttrium Y, or hafnium Hf. As an alloy or compound of them, for example, an alloy or compound expressed by a chemical formula $Ma_fMb_gLi_h$ or a chemical formula $Ma_sMc_tM_d$, can be mentioned. In those chemical formulae, Ma denotes at least one kind of metal elements and semimetal elements which can form an alloy together with lithium, Mb denotes at least one kind of metal elements and semimetal elements other than lithium and Ma, Mc denotes at least one kind of non-metal elements, and Md denotes at least one kind of metal elements and semimetal elements other than Ma. Values of f, g, h, s, t, and u lie within ranges of $f>0$, $g\geq 0$, $h\geq 0$, $s>0$, $t>0$, and $u\geq 0$, respectively.

Among them, a simple substance, an alloy, or a compound of a metal element or semimetal element in Group 4B in a short period type periodic table is preferable. Particularly, silicon Si, tin Sn, or an alloy or compound of them is preferable. They may be crystalline or amorphous.

As anode materials which can dope and dedope lithium Li, an oxide, a sulfide, or another metal compound such as a lithium nitride such as $LiN_3$, or the like can be further mentioned. As an oxide, $MnO_2$, $V_2O_5$, $V_6O_{13}$, NiS, MoS, or the like can be mentioned. As an oxide whose electric potential is relatively low and which can dope and dedope lithium, for example, iron oxide, ruthenium oxide, molybdenum oxide, tungsten oxide, titanium oxide, tin oxide, or the like can be mentioned. As a sulfide, NiS, MoS, or the like can be mentioned.

[Electrolytic Solution]

As an electrolytic solution, a non-aqueous electrolytic solution obtained by dissolving electrolytic salt into a non-aqueous solvent can be used. As a non-aqueous solvent, various kinds of solvents such as solvent of a high dielectric constant and solvent of a low viscosity can be mentioned. The non-aqueous solvent used in the non-aqueous electrolyte secondary battery in the related art can be used.

As a solvent of the high dielectric constant, for example, ethylene carbonate EC, propylene carbonate PC, and the like can be preferably used. However, the present application is not limited to them but cyclic carbonate such as butylene carbonate BC, vinylene carbonate VC, 4-fluoro-1,3-dioxorane-2-on (fluoroethylene carbonate), 4-chloro-1,3-dioxorane-2-on (chloroethylene carbonate), trifluoro methyl ethylene carbonate, or the like can be used.

As a solvent of the high dielectric constant, in place of or together with the cyclic carbonate, lactone such as γ-butyrolactone, γ-valerolactone, and the like, lactam such as N-methyl-2-pyrolidone NMP or the like, cyclic carbamic ester such as N-methyl oxazolidinone or the like, a sulfonic compound such as tetramethylene sulfone or the like, or the like can be also used.

As a solvent of the low viscosity, diethyl carbonate DEC can be preferably used. However, beside it, the following solvent can be used: chain-like carbonate such as dimethyl carbonate DMC, ethylmethyl carbonate EMC, methylpropyl carbonate MPC, or the like; chain-like carboxylic ester such as methyl acetate, ethyl acetate, methyl propionate, ethyl propionate, methyl butyrate, methyl isobutyrate, trimethyl methyl acetate, trimethyl ethyl acetate or the like; chain-like amide such as N,N-dimethyl acetamide or the like; chain-like carbamic ester such as N,N-diethyl methyl carbamate, N,N-diethyl ethyl carbamate, or the like; or ether such as 1,2-dimethoxy ethane, tetrahydro furan, tetrahydro pyrane, 1,3-dioxolan, or the like.

As a solvent, one kind of the solvent of the high dielectric constant and the solvent of the low viscosity mentioned above can be solely used, or two or more kinds of them may be arbitrarily mixed and used. However, a solvent containing the cyclic carbonate of 20 to 50% and the solvent of the low viscosity (non-aqueous solvent of the low viscosity) of 50 to 80% is preferable. Particularly, the chain-like carbonate whose boiling point is equal to or lower than 130° C. is preferable as a solvent of the low viscosity. If a ratio between the cyclic carbonate and the solvent of the low viscosity is out of the foregoing range, for example, when an amount of solvent of the low viscosity is too large, the dielectric constant is low. On the contrary, if the amount of solvent of the low viscosity is too small, the viscosity is low. In both of the above cases, therefore, it is difficult to obtain the sufficient conductivity and there is a risk that it is difficult to obtain good battery characteristics.

As electrolytic salt, for example, lithium salt can be mentioned as salt which is dissolved or dispersed into the foregoing non-aqueous solvent and ions are generated.

As lithium salt, for example, the following materials can be mentioned: inorganic lithium salt such as lithium phosphate hexafluoride $LiPF_6$, lithium borate tetrafluoride $LiBF_4$, lithium arsenate hexafluoride $LiAsF_6$, lithium antimonate hexafluoride $LiSbF_6$, lithium perchlorate $LiClO_4$, lithium aluminum acid tetrachloride $LiAlCl_4$, or the like; a perfluoroalkane sulfonic derivative such as lithium trifluoro methane sulfonate $LiCF_3SO_3$, lithium bis(trifluoro methane sulfone) imide $LiN(CF_3SO_2)_2$, lithium bis(pentafluoro ethane sulfone) imide $LiN(C_2F_5SO_2)_2$, lithium tris (trifluoro methane sulfone) methide $LiC(CF_3SO_2)_3$, or the like; and the like. One kind of them can be solely used, or two or more kinds of them may be combined and used. Among them, lithium phosphate hexafluoride $LiPF_6$ is preferable because a high ion conductivity can be obtained and the cycle characteristics can be improved.

A content of such electrolytic salt lies within, preferably, a range from 0.1 mol to 3.0 mol to the solvent 11, much preferably, a range from 0.5 mol to 2.0 mol. This is because the higher ion conductivity can be obtained when the content lies within such a range.

[Separator]

The separator 23 allows the lithium ions to pass while isolating the cathode 21 and the anode 22 and preventing a short-circuit of a current caused by the contact between them.

As a separator 23, for example, the separator which has been used in the battery in the related art and is formed by a microporous membrane made of a synthetic resin such as polytetrafluoroethylene PTFE, polypropylene PP, polyethylene PE, or the like or a microporous membrane made of ceramics can be used, or a separator having a structure in which the surface of the microporous membrane as mentioned above has been coated with polyvinylidene fluoride PVdF, polytetrafluoroethylene PTFE, or the like and a porous resin layer has been formed on the surface can be used. Among them, the separator 23 having the structure in which the porous resin layer has been formed on the surface is preferable because the excellent cycle characteristics can be obtained even at a high charge voltage.

Figure 3:
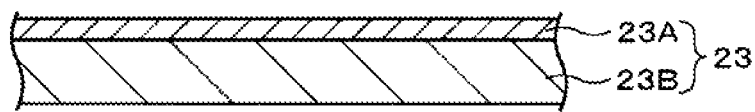
FIG. 3 is an enlarged cross sectional view showing a constructional example of a separator which is used in the battery according to a first embodiment.

An example and another example of the structure of the separator 23 in which the porous resin layer has been formed on the microporous membrane will be described hereinbelow with reference to FIGS. 3 and 4. FIG. 3 is an enlarged cross sectional view showing an example of the structure of the separator 23 as mentioned above. As shown in FIG. 3, the separator 23 may have a structure in which a resin layer 23A has been formed on one principal plane of a base material layer 23B. As a material of the base material layer 23B, the material used in the battery in the related art, for example, the microporous membrane as mentioned above can be used. For example, a microporous membrane containing at least one kind selected from polyethylene PE, polypropylene PP, their copolymer, and polyolefin PO as a combination of them can be used. Among them, it is particularly preferable to use the microporous membrane made of polyolefin which has an excellent short-circuit preventing effect and can improve safety of the battery owing to a shut-down effect. Specifically speaking, for example, the microporous membrane made of polyethylene PE or polypropylene PP is preferable.

Although the base material layer 23B shown in FIG. 3 has the single-layer structure, the base material layer 23B may have a multilayer structure. As a base material layer having the multilayer structure, more specifically speaking, for example, a microporous membrane having a triple-layer structure in which a polypropylene PP layer, a polyethylene PE layer, and a polypropylene PP layer have sequentially been laminated or the like can be used. If the microporous membrane formed by the mixture of polyethylene and polypropylene or the microporous membrane having the triple-layer structure in which the polypropylene PP layer, polyethylene PE layer, and polypropylene PP layer have sequentially been laminated is used as a base material layer 23B, since proper air permeability and strength can be easily obtained as a separator 23, which will be explained hereinafter, those membranes are preferable.

The resin layer 23A is a matrix resin layer having high porosity. By having the matrix resin layer, it is prevented that the electrode is directly come into contact with the base material layer 23B of the separator 23. Therefore, a deterioration such as carbonization or choke of the base material layer 23B which is caused by an oxidation reduction reaction can be suppressed, so that a deterioration of the battery characteristics can be suppressed.

As a matrix resin, specifically speaking, for example, polyvinylidene fluoride PVdF, hexafluoro propylene HFP, polytetrafluoroethylene PTFE, or the like can be used or their copolymer can be also used.

As a resin layer 23A, a layer in which an inorganic substance has been held to the matrix resin layer may be used. By having the resin layer in which the inorganic substance has been held to the matrix resin, an oxidation resistance can be further improved and a deterioration of the separator 23 can be suppressed.

As an inorganic substance, a metal, a semiconductor, or their oxide or nitride can be mentioned. Specifically speaking, for example, aluminum Al, titanium Ti, or the like can be mentioned as a metal. For example, silicon Si, boron B, or the like can be mentioned as a semiconductor. Aluminum oxide $Al_2O_3$, titanium dioxide $TiO_2$, silicon dioxide $SiO_2$, or the like can be mentioned as an oxide. Boron nitride BN, aluminum nitride AlN, or the like can be mentioned as a nitride.

It is preferable that a grain diameter of the inorganic substance lies within a range from 1 nm or more to 10 μm or less. This is because if it is smaller than 1 nm, it is difficult to obtain such an inorganic substance and even if it can be obtained, its costs are high, and if it is larger than 10 μm, a distance between the electrodes increases, it is difficult to obtain a sufficient filling amount of active material due to a limited space, and a battery capacitance decreases.

As a method of forming the resin layer 23A, the resin layer 23A can be formed by a method whereby, for example, the surface of the base material layer 23B is coated with a slurry made of a matrix resin, a solvent, and an inorganic substance, it is allowed to pass through a poor solvent of the matrix resin and a good solvent bath of the solvent so as to be phase-separated, and thereafter, dried.

It is preferable that a piercing strength of such a separator 23 lies within a range from 100 gf or more to 1000 gf or less. This is because if the piercing strength is small, there is a case where a short-circuit occurs and, if it is large, ion conductivity decreases. The piercing strength can be obtained by measuring the maximum load at the time when a needle whose tip has a diameter $\phi$ of 1.0 mm has been pierced at a rate of 2 mm/sec by using a Handy-type Compression Tester (KES-G5 made by KATO TECH Co., Ltd.).

An air permeability of the separator 23 lies within, preferably, a range from 30 sec/100 cc or more to 1000 sec/100 cc or less, much preferably, a range from 50 sec/100 cc or more to 600 sec/100 cc or less, and further preferably, a range from 100 sec/100 cc or more to 400 sec/100 cc or less. This is because if the air permeability is small, there is a case where the short-circuit occurs and, if it is large, the ion conductivity decreases. By decreasing the thickness of base material layer 23B or resin layer 23A, the air permeability can be reduced and it can also contribute to the increase in capacitance of the battery. However, generally, a decrease in piercing strength of the separator 23 is liable to occur. The air permeability is measured according to JIS P8117 and shows the number of seconds during which the air of a pressure of 1.22 kPa and 100 cc penetrates the membrane.

It is preferable that a thickness of base material layer 23B lies within a range, for example, from 5 μm or more to 15 μm or less. This is because if the thickness is small, the short-circuit is liable to occur and, if it is large, the ion conductivity decreases and a volume capacitance decreases.

It is preferable that a thickness of resin layer 23A lies within a range, for example, from 0.2 μm or more to 10 μm or less. This is because if the thickness is small, the short-circuit is liable to occur and, if it is large, the ion conductivity decreases and a volume capacitance decreases.

A weight per unit area of one surface of the resin layer 23A (hereinbelow, the weight per unit area is properly called a surface density) lies within, preferably, a range from 0.05 $mg/cm^2$ or more to 0.5 $mg/cm^2$ or less, and much preferably, a range from 0.1 $mg/cm^2$ or more to 0.3 $mg/cm^2$ or less. This is because if the surface density of the resin layer 23A is too small, a gel electrolytic layer between the electrode and the separator is insufficient and the improvement of the oxidation resistance of the separator is insufficient and, if the surface density is large, the ion conductivity decreases.

Figure 4:
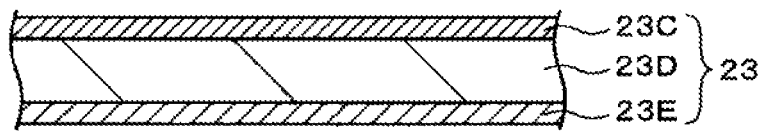
FIG. 4 is an enlarged cross sectional view showing another constructional example of a separator which is used in the battery according to a first embodiment.

FIG. 4 is an enlarged cross sectional view showing another example of the structure of the separator 23. As shown in FIG. 4, the separator 23 has a structure in which a resin layer 23C and a resin layer 23E have been formed on both surfaces of a base material layer 23D. The resin layers 23C and 23E may be made of different materials. Since a construction other than the structure of the separator 23 is similar to that of the example described with reference to FIG. 3, its detailed explanation is omitted.

An electrolytic solution as a liquid electrolyte has been impregnated in the separator 23.

Although an upper limit charge voltage of the secondary battery may be set to, for example, 4.20V, it is preferable to design the battery so that the upper limit charge voltage is higher than 4.20V, much preferably, it lies within a range from 4.25V or more to 4.80V or less and, further preferably, a range from 4.35V or more to 4.65V or less. It is preferable that a lower limit discharge voltage lies within a range from 2.00V or more to 3.30V or less. By setting the battery voltage to be high, an energy density can be raised. In addition, according to the first embodiment, since the coating layer in which distribution states of the element M and the halogen element X are different has been formed on the cathode active material, even if the battery voltage is set to be high, the excellent cycle characteristics are obtained and the generation of gases in the battery can be suppressed.

(1-3) Manufacturing Method of Secondary Battery

Subsequently, an example of a manufacturing method of the secondary battery according to the first embodiment will be described.

The cathode active material is manufactured as follows. For example, the cathode active material can be formed by the following method. As a composite oxide particle serving as a mother particle, a lithium-contained transition metal oxide which can be generally obtained as a cathode active material is used as a starting raw material, the composite oxide particle and a compound containing the element M and the halogen element X with which the composite oxide particle is coated are ground and mixed, and the surface of the composite oxide particle is coated with the elements M and X. As coating means, for example, a ball mill, a jet mill, a grinder, a pulverizer, or the like can be used. In this case, it is also effective to add a small amount of liquid such as water and execute the coating process. The surface of the composite oxide particle can be also coated with the element M and the halogen element X by a mechanochemical process such as a mechano fusion or the like, a sputtering method, or a vapor phase method such as a CVD (Chemical Vapor Deposition) method or the like. Further, the surface can be also coated with the element M and the halogen element X by a wet method such as method of mixing a raw material in the water or in a solvent such as ethanol or the like, neutralization titration method, sol-gel method using metal alkoxide as a raw material, or the like. The coating layer may be formed by a method whereby a raw material serving as a raw material of a predetermined coating layer is mixed into an electrolytic solution or an electrode of the secondary battery, thereby forming the secondary battery, and thereafter, charge/discharge, heating, and the like are executed.

The composite oxide particle whose surface has been coated with the element M, element M', and halogen element X or their row material may be baked at a temperature within, for example, a range from 200° C. or more to 1000° C. or less in the air or in an oxidation atmosphere such as pure oxygen or the like. On the other hand, after the baking, its grain size may be also adjusted by a light grinding or classifying operation or the like as necessary. Further, different coating layers may be formed by executing the coating process twice or more times.

The cathode 21 is formed as follows. First, for example, a cathode mixture is adjusted by mixing a cathode active material, a conductive material, and a binder. The cathode mixture is dispersed into a solvent such as N-methyl-2-pyrolidone NMP or the like, thereby forming a cathode mixture slurry. Subsequently, the cathode collector 21A is coated with the cathode mixture slurry and the solvent is dried. After that, it is compression molded by a roll pressing machine or the like, thereby forming the cathode active material layers 21B and obtaining the cathode 21.

The anode 22 is formed as follows. First, for example, an anode mixture is adjusted by mixing an anode active material and a binder. The anode mixture is dispersed into a solvent such as N-methyl-2-pyrolidone NMP or the like, thereby forming an anode mixture slurry. Subsequently, the anode collector 22A is coated with the anode mixture slurry and the solvent is dried. After that, it is compression molded by a roll pressing machine or the like, thereby forming the anode active material layers 22B and obtaining the anode 22.

Subsequently, the cathode lead 25 is attached to the cathode collector 21A by welding or the like and the anode lead 26 is attached to the anode collector 22A by welding or the like. After that, the cathode 21 and anode 22 are wound through the separator 23. A front edge portion of the cathode lead 25 is welded to the relief valve mechanism 15 and a front edge portion of the anode lead 26 is welded to the battery can 11. The wound cathode 21 and anode 22 are sandwiched between the pair of insulating plates 12 and 13 and enclosed into the battery can 11. After the cathode 21 and anode 22 were enclosed into the battery can 11, an electrolyte is injected into the battery can 11 so as to be impregnated into the separator 23. After that, the battery cap 14, relief valve mechanism 15, and PTC 16 are caulked through the gasket 17 and fixed to an open edge portion of the battery can 11. In this manner, the secondary battery shown in FIG. 1 is manufactured.

In the secondary battery, when the charge is executed, for example, lithium ions are dedoped from the cathode active material layers 21B and doped into the anode active material layers 22B through the electrolytic solution. When the discharge is executed, for example, lithium ions are dedoped from the anode active material layers 22B and doped into the cathode active material layers 21B through the electrolytic solution.

As described above, the secondary battery according to the first embodiment is constructed in such a manner that the coating layer containing the element M and the halogen element X has been formed on the surface of the composite oxide particle of the cathode active material and M and X in the coating layer have the different distribution states. Therefore, an increase in internal resistance in the battery can be suppressed and both of the large capacitance of the secondary battery and the improvement of the battery characteristics can be realized.

Although the improvement reason of the battery characteristics is obscure, it is presumed that such an improvement reason is derived by the following mechanism. In the lithium ion secondary battery which is in the charging state, the cathode is located under an environment of a high oxidation degree. Therefore, the electrolytic solution which is come into contact with the cathode active material is oxidation decomposed, an inert coating film is formed on a solid-liquid interface, the cathode active material itself is decomposed, and component elements are dissolved. It is considered that the formed coating film or a resistance component caused when the eluted transition metal is reduction precipitated to the anode obstructs the movement of electrons or lithium ions, so that the battery performance is deteriorated.

On the other hand, in the lithium-contained transition metal oxide according to the embodiment, it is considered that since the active material surface has been coated with the element M different from the main transition metal elements in the particle, the elution of the main transition metal elements is suppressed and the increase in internal resistance and the deterioration in cycle characteristics or the like in association with it are suppressed. Further, it is considered that the halogen element X distributed onto the surface of the lithium-contained transition metal reacts to impurities on the surface of the lithium-contained transition metal and is stabilized, and the distribution on the surface is smaller than that of the element M and does not obstruct the movement of lithium ions, so that it contributes to both of the realization of the large capacitance and the improvement of the battery characteristics.

The secondary battery according to the first embodiment is light-weighted and has the characteristics of the large capacitance and the high energy density and can be widely used for portable small electronic apparatuses such as video camera, notebook-sized personal computer, digital camera, machine tool, cellular phone, and the like.

(2) Second Embodiment (2-1) Cathode Active Material

As a cathode active material, a material similar to the cathode active material described in the first embodiment can be used.

(2-2) Construction of Secondary Battery

Figure 5:
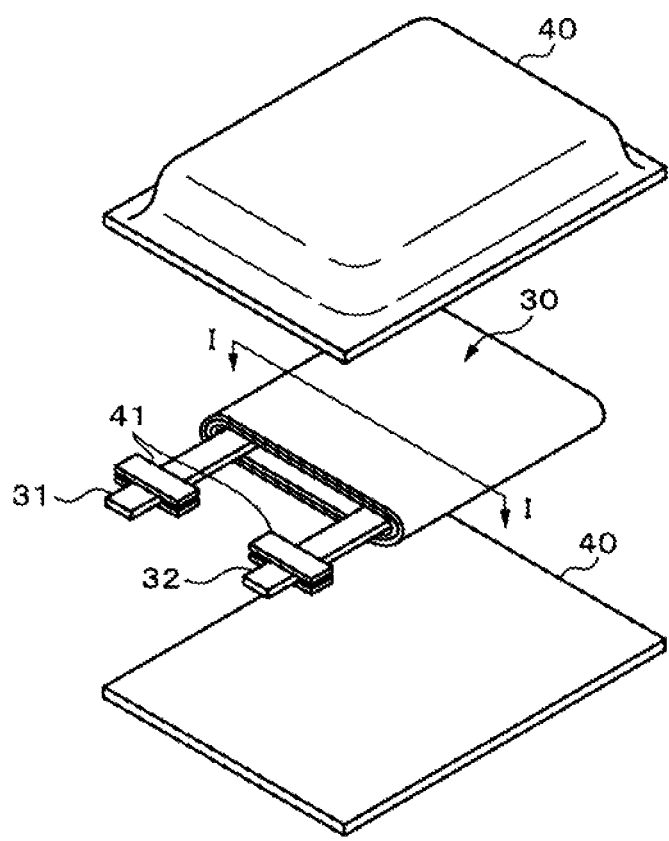
FIG. 5 is a cross sectional view showing a constructional example of a battery according to a second embodiment.

FIG. 5 shows a construction of the secondary battery according to the second embodiment. This secondary battery is what is called a laminate film type. A winded electrode member 30 to which a cathode lead 31 and an anode lead 32 have been attached is enclosed in a film-like sheathing member 40.

Each of the cathode lead 31 and the anode lead 32 is directed from the inside of the sheathing member 40 toward the outside and is led out, for example, in the same direction. The cathode lead 31 is made of, for example, a metal material such as aluminum Al, stainless SUS, or the like. The anode lead 32 is made of, for example, a metal material such as copper Cu, nickel Ni, or the like. Each of the cathode lead 31 and the anode lead 32 is formed in a thin plate shape or a mesh shape.

[Sheathing Member]

The sheathing member 40 is formed by a rectangular laminate film obtained by adhering, for example, an outside resin layer made of nylon Ny, polyethylene terephthalate PET, or the like, a metal layer made of aluminum Al or the like, and an inside resin layer made of polypropylene PP, polyethylene PE, or the like in this order. The sheathing member 40 is arranged so that, for example, the inside resin layer side faces the winded electrode member 30 and their outer edge portions are mutually adhered by melt-bonding or an adhesive. An adhesive film 41 to prevent the invasion of the outside atmosphere is inserted between the sheathing member 40 and the cathode lead 31. Likewise, the adhesive film 41 is inserted between the sheathing member 40 and the anode lead 32. The adhesive film 41 is made of a material having adhesion to each of the cathode lead 31 and the anode lead 32. For example, the adhesive film 41 is made of a polyolefin resin such as polyethylene PE, polypropylene PP, denatured polyethylene, denatured polypropylene, or the like. In the case of using denatured polyethylene or denatured polypropylene, since the adhesion between the adhesive film 41 and the cathode lead 31 and the adhesion between the adhesive film 41 and the anode lead 32 are further improved, it is preferable.

The sheathing member 40 may be formed by a laminate film having another structure, a high molecular film such as polypropylene or the like, or a metal film in place of the foregoing laminate film.

[Winded Electrode Member]

Figure 6:
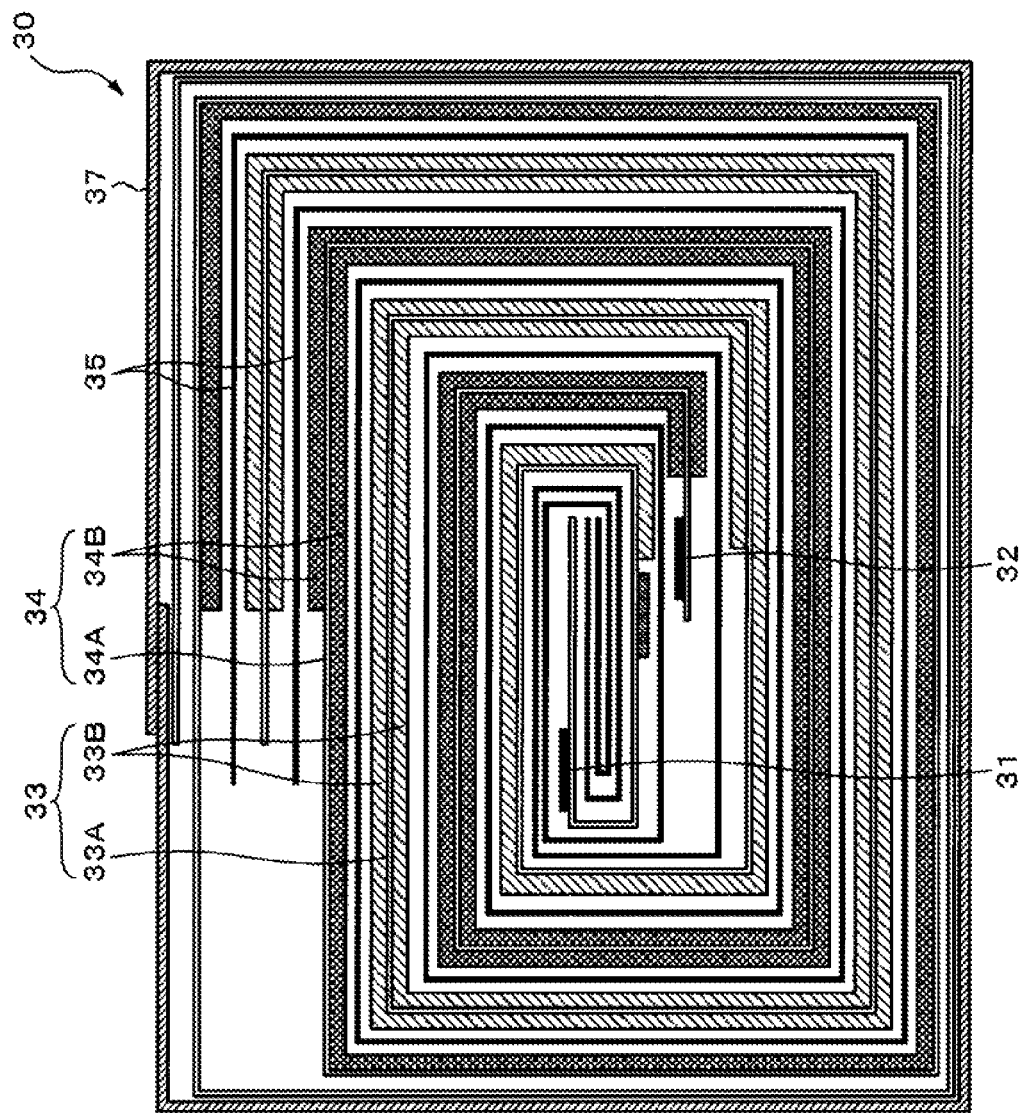
FIG. 6 is a cross sectional view taken along the line I-I of a winded electrode member enclosed in the battery according to a second embodiment.

FIG. 6 illustrates a cross sectional structure taken along the line I-I of the winded electrode member 30 shown in FIG. 5. The winded electrode member 30 is formed by laminating a cathode 33 and an anode 34 through separators 35 and electrolytic layers (not shown) and winding. An outermost peripheral portion of the winded electrode member 30 is protected by a protecting tape 37. The electrolytic layer has previously been formed on the surface of each of the cathode 33 and the anode 34.

The cathode 33 has a structure in which a cathode active material layer/layers 33B is/are formed on one surface or both surfaces of a cathode collector 33A. The anode 34 has a structure in which an anode active material layer/layers 34B is/are formed on one surface or both surfaces of an anode collector 34A. The anode active material layer 34B and the cathode active material layer 33B are arranged so as to face each other. Constructions of the cathode collector 33A, cathode active material layer 33B, anode collector 34A, anode active material layer 34B, and separator 35 are similar to those of the cathode collector 21A, cathode active material layer 21B, anode collector 22A, anode active material layer 22B, and separator 23 in the secondary battery according to the first embodiment mentioned above.

The electrolytic layer contains an electrolytic solution and a high molecular compound serving as a holder for holding the electrolytic solution and is what is called a gel state. The gel-like electrolyte is preferable because high conductivity can be obtained and a leakage of the solution of the battery can be prevented. A construction of the electrolytic solution (that is, a non-aqueous solvent, electrolytic salt, and the like) is similar to that in the secondary battery according to the first embodiment.

As a high molecular material, various kinds of high polymer which can absorb the foregoing electrolytic solution and convert it into the gel state can be used. Specifically speaking, for example, a fluoro high polymer such as poly (vinylidene fluoride), poly (vinylidene fluoride-co-hexafluoro propylene), or the like, an ether system high polymer such as poly (ethylene oxide), cross-linked polyethylene oxide, or the like, poly (acrylonitrile), or the like can be used. Particularly, from a viewpoint of oxidation reduction stability, it is preferable to use a fluoro high polymer such as a copolymer of vinylidene fluoride or the like.

(2-3) Manufacturing Method of Secondary Battery

Subsequently, an example of a manufacturing method of a secondary battery according to the second embodiment will be described.

First, each of the cathode 33 and the anode 34 is coated with a presolution containing an electrolytic solution, a high polymer compound, and a mixed solvent and the mixed solvent is volatilized, thereby forming an electrolytic layer. After that, the cathode lead 31 is attached to an edge portion of the cathode collector 33A by welding and the anode lead 32 is attached to an edge portion of the anode collector 34A by welding. Subsequently, the cathode 33 and the anode 34 on each of which the electrolytic layer has been formed are laminated through the separator 35, thereby forming a laminate material. The laminate material is wound in its longitudinal direction and the protecting tape 37 is adhered to the outermost peripheral portion, thereby forming the winded electrode member 30. Finally, for example, the winded electrode member 30 is sandwiched between the sheathing members 40 and outer edge portions of the sheathing members 40 are adhered by the thermal melt-bonding or the like, thereby sealing the winded electrode member 30. At this time, the adhesive film 41 is inserted between the cathode lead 31 and the sheathing member 40 and the adhesive film 41 is similarly inserted between the anode lead 32 and the sheathing member 40. Thus, the secondary battery shown in FIGS. 3 and 4 is completed.

The secondary battery may be manufactured as follows. First, the cathode 33 and the anode 34 are formed as mentioned above. The cathode lead 31 and the anode lead 32 are attached to the cathode 33 and the anode 34. After that, the cathode 33 and the anode 34 are laminated through the separator 35 and wound. The protecting tape 37 is adhered to the outermost peripheral portion. A winded member as a precursor of the electrode member 30 is formed. Subsequently, the winded member is sandwiched between the sheathing members 40 and their outer peripheral edge portions excluding one side are thermally melt-bonded into a sack form and the winded electrode member 30 is enclosed in the sheathing member 40. Subsequently, compositions (for the electrolyte) containing, an electrolytic solution, a monomer as a raw material of a high polymer compound, a polymerization initiator, and another material such as a polymerization inhibitor or the like as necessary are prepared and injected into the sheathing member 40.

After the compositions for the electrolyte were injected, an opening portion of the sheathing member 40 is thermally melt-bonded under a vacuum atmosphere and sealed. Subsequently, the monomer is polymerized by applying a heat and a high polymer compound is formed, thereby forming the gel-like electrolyte. In this manner, the secondary battery shown in FIGS. 5 and 6 is obtained.

Also in the secondary battery of the second embodiment, since an increase in internal resistance in the battery is suppressed by the coating layer containing the halogen element X, both of the large capacitance of the secondary battery and the improvement of the battery characteristics can be realized.

EXAMPLES

Although the present application will be specifically explained by Examples hereinbelow, the present application is not limited only to such Examples.

Example 1

Manufacturing of Cathode

A manufacturing method of the cathode active material will be explained hereinbelow. First, lithium cobalt acid $LiCoO_2$ in which a mean diameter measured by a laser scattering method is equal to 13 µm is prepared as a composite oxide particle serving as a mother particle. Subsequently, as a coating material, manganese carbonate $MnCO_3$ is basis-weighted and mixed to lithium cobalt acid $LiCoO_2$ so that an atom ratio of cobalt Co:manganese Mn=100:2. Subsequently, a mixed powder of lithium cobalt acid $LiCoO_2$ and manganese carbonate $MnCO_3$ is processed for one hour by using a mechanochemical apparatus and the surface of lithium cobalt acid $LiCoO_2$ is coated with $MnCO_3$, thereby forming a baked precursor. A temperature of the baked precursor is raised at a rate of 3° C. per minute. The baked precursor is thermally processed at 900° C. for three hours and, thereafter, cooled, so that a particle in which manganese Mn has uniformly been distributed on the surface of lithium cobalt acid $LiCoO_2$ is obtained.

Further, lithium fluoride LiF is basis-weighted and mixed to 100 weight parts of the particle so that an atom ratio of cobalt Co:fluorine F=100:2. Similarly, the obtained particle is thermally processed at 800° C., thereby obtaining the cathode active material.

Figure 7A:
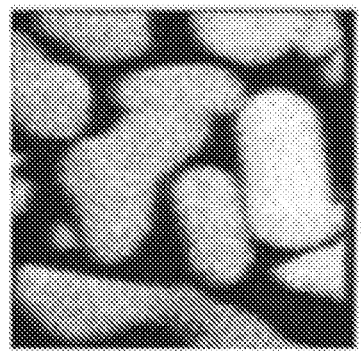
FIGS. 7A, 7B, and 7C show cross sectional images of a cathode active material of the Example 1.
Figure 7B:
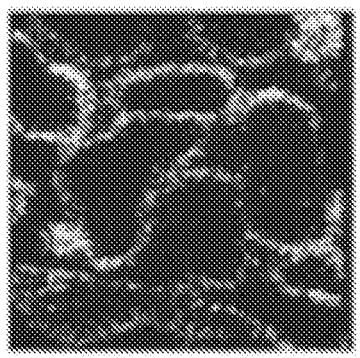
Figure 7C:
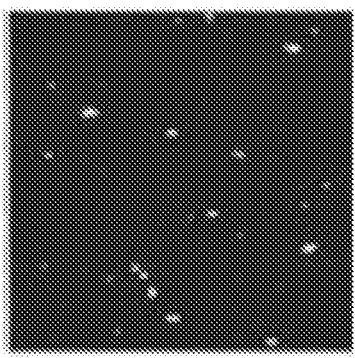

The powder of the obtained cathode active material is observed by the SEM/EDX. FIG. 7A is an SEM/EDX image showing distribution of cobalt Co of a cross section of the cathode active material particle of Example 1. In FIG. 7A, cobalt Co is illustrated by white portions. FIG. 7B is an SEM/EDX image showing distribution of manganese Mn of the cross section of the cathode active material particle shown in FIG. 7A. In FIG. 7B, manganese Mn is illustrated by white portions. FIG. 7C is an SEM/EDX image showing distribution of fluorine F of the cross section of the cathode active material particle shown in FIG. 7A. In FIG. 7C, fluorine F is illustrated by white portions. As shown in FIGS. 7A to 7C, it has been confirmed that manganese Mn has uniformly been distributed on the surface of the composite oxide particle containing cobalt Co and fluorine F has been dotted on the surface of the composite oxide particle.

With respect to the powder, a powder XRD (X-ray diffraction) pattern using CuKα of a long wavelength is measured, so that a diffraction peak of LiF has been confirmed in addition to a diffraction peak corresponding to $LiCoO_2$ having the stratified rock-salt structure.

Further, an element ratio of the surface of the cathode active material particle is measured by the XPS, so that $$A/(M+M'+X+A)=Co/(Mn+Li+F+Co)=0.26 \text{ is obtained,}$$

where:
- the element A indicates cobalt Co;
- the element M indicates an element in Groups 2 to 16 of the periodic table excluding Co;
- the element M' indicates Li; and
- the halogen element X indicates F.

The cathode is manufactured as will be explained hereinbelow by using the cathode active material obtained as mentioned above. First, the cathode mixture is adjusted by mixing the foregoing cathode active material of 98 wt %, an amorphous carbon powder (ketjen black) of 0.8 wt % as a conductive material, and polyvinylidene fluoride PVDF of 1.2 wt % as a binder. The cathode mixture is dispersed into N-methyl-2-pyrolidone NMP, thereby forming the cathode mixture slurry. After that, both surfaces of the cathode collector made by belt-shaped aluminum foil having a thickness of 20 µm are uniformly coated with the cathode mixture slurry. The obtained coated material is dried by a warm current of air and, thereafter, compression-molded by the roll pressing machine, thereby forming the cathode active material layers. After that, the cathode lead made of aluminum is attached to one end of the cathode collector.

[Manufacturing of Anode]

The anode is manufactured as follows. First, the anode mixture is adjusted by mixing a graphite powder of 95 wt % as an anode active material and polyvinylidene fluoride PVdF of 5 wt % as a binder. The anode mixture is dispersed into N-methyl-2-pyrolidone NMP, thereby forming the anode mixture slurry. After that, both surfaces of the anode collector made by belt-shaped copper foil having a thickness of 15 µm are uniformly coated with the anode mixture slurry. Further, by press-molding the obtained coated material with a heat, the anode active material layers are formed. After that, the anode lead made of nickel is attached to one end of the anode collector.

[Manufacturing of Winded Electrode Member]

Subsequently, as for the cathode and anode manufactured as mentioned above, the anode, separator, cathode, and separator are laminated in this order by using the separator made of a porous polyolefin film and the obtained laminate material is wound a number of times, thereby manufacturing the winded electrode member. The winded electrode member is enclosed into the nickel-plated battery can made of iron. At this time, insulating plates are arranged onto both of the upper and lower surfaces of the winded electrode member. Subsequently, the cathode lead is led out of the cathode collector and welded to a projecting portion of a relief valve whose electrical conduction with a battery cap has been assured. The anode lead is led out of the anode collector and welded to a bottom portion of the battery can.

[Manufacturing of Non-Aqueous Electrolytic Solution]

The non-aqueous electrolytic solution is adjusted by dissolving lithium phosphate hexafluoride $LiPF_6$ into a non-aqueous solvent in which a volume mixture ratio of ethylene carbonate EC and methylethyl carbonate MEC is equal to 1:1 so as to obtain concentration of 1 $mol/dm^3$.

Finally, after the electrolytic solution was injected into the battery can in which the foregoing electrode member has been built, by caulking the battery can through an insulation gasket, the relief valve, PTC element, and battery cap are fixed and the cylindrical secondary battery in which an outer diameter is equal to 18 mm and a height is equal to 65 mm is manufactured.

The battery characteristics of the obtained secondary battery are evaluated as follows.

(a) Initial Capacitance

After the constant current/constant voltage charge was executed under conditions in which an environment temperature is equal to 45° C., a charge voltage is equal to 4.40V, a charge current is equal to 1500 mA, and a charging time is equal to 2.5 hours, the discharge is executed at a discharge current of 2000 mA and a terminating voltage of 3.0V and an initial capacitance is measured.

(b) Capacitance Maintaining Ratio

Further, the charge and discharge are repeated under conditions similar to those in the case where the initial capacitance was obtained. A discharge capacitance at the 200th cycle is measured and a capacitance maintaining ratio for the initial capacitance is obtained.

(c) Internal Resistance

After the charge and discharge were repeated 200 cycles under the above conditions, an internal resistance of the secondary battery is measured.

Example 2

The cylindrical secondary battery is manufactured in a manner similar to Example 1 except that $LiCo_{0.98}Al_{0.01}Mg_{0.01}O_2$ is used as a composite oxide particle of the cathode active material.

The powder of the obtained cathode active material is observed by the SEM/EDX, so that it has been confirmed that manganese Mn has uniformly been distributed on the surface of the composite oxide particle containing cobalt Co and fluorine F has been dotted on the surface of the composite oxide particle.

With respect to the powder, a powder XRD pattern using CuKα of the long wavelength is measured, so that the diffraction peak of LiF has been confirmed in addition to the diffraction peak corresponding to $LiCoO_2$ having the stratified rock-salt structure.

Further, an element ratio of the surface of the cathode active material particle is measured by the XPS, so that $A/(M+M'+X+A)=Co/(Mn+Li+F+Co)=0.32$ is obtained.

The battery characteristics (a) to (c) of the secondary battery obtained as mentioned above are evaluated in a manner similar to Example 1.

Example 3

The cylindrical secondary battery is manufactured in a manner similar to Example 1 except that $LiCo_{0.98}Zr_{0.02}O_2$ is used as a composite oxide particle of the cathode active material.

The powder of the obtained cathode active material is observed by the SEM/EDX, so that it has been confirmed that manganese Mn has uniformly been distributed on the surface of the composite oxide particle containing cobalt Co and fluorine F has been dotted on the surface of the composite oxide particle.

With respect to the powder, the powder XRD pattern using CuKα of the long wavelength is measured, so that the diffraction peak of LiF has been confirmed in addition to the diffraction peak corresponding to $LiCoO_2$ having the stratified rock-salt structure.

Further, an element ratio of the surface of the cathode active material particle is measured by the XPS, so that $A/(M+M'+X+A)=Co/(Mn+Li+F+Co)=0.31$ is obtained.

The battery characteristics (a) to (c) of the secondary battery obtained as mentioned above are evaluated in a manner similar to Example 1.

Example 4

The cylindrical secondary battery is manufactured in a manner similar to Example 1 except that $LiNi_{0.80}Co_{0.20}O_2$ is used as a composite oxide particle of the cathode active material.

The powder of the obtained cathode active material is observed by the SEM/EDX, so that it has been confirmed that manganese Mn has uniformly been distributed on the surface of the composite oxide particle containing cobalt Co and fluorine F has been dotted on the surface of the composite oxide particle.

With respect to the powder, the powder XRD pattern using CuKα of the long wavelength is measured, so that the diffraction peak of LiF has been confirmed in addition to the diffraction peak corresponding to $LiCoO_2$ having the stratified rock-salt structure.

Further, an element ratio of the surface of the cathode active material particle is measured by the XPS, so that $A/(M+M'+X+A)=Co/(Mn+Li+F+Co)=0.29$ is obtained.

The battery characteristics (a) to (c) of the secondary battery obtained as mentioned above are evaluated in a manner similar to Example 1.

Example 5

The battery characteristics (a) to (c) are evaluated in a manner similar to Example 1 except that the charge voltage is set to 4.20V.

Example 6

The battery characteristics (a) to (c) are evaluated in a manner similar to Example 1 except that the charge voltage is set to 4.35V.

Example 7

The battery characteristics (a) to (c) are evaluated in a manner similar to Example 1 except that the charge voltage is set to 4.50V.

Example 8

The cathode active material is obtained in a manner similar to Example 1 except that when manganese carbonate $MnCO_3$ is mixed, manganese carbonate $MnCO_3$ is basis-weighted and mixed so that an atom ratio of cobalt Co:manganese Mn=100:0.5, and when lithium fluoride LiF is mixed, lithium fluoride LiF is basis-weighted and mixed so that an atom ratio of cobalt Co:fluorine F=100:1.

The powder of the obtained cathode active material is observed by the SEM/EDX, so that it has been confirmed that manganese Mn has uniformly been distributed on the surface of the composite oxide particle containing cobalt Co and fluorine F has been dotted on the surface of the composite oxide particle.

With respect to the powder, the powder XRD pattern using CuKα of the long wavelength is measured, so that the diffraction peak of LiF has been confirmed in addition to the diffraction peak corresponding to $LiCoO_2$ having the stratified rock-salt structure.

Further, an element ratio of the surface of the cathode active material particle is measured by the XPS, so that $A/(M+M'+X+A)=Co/(Mn+Li+F+Co)=0.76$ is obtained.

The battery characteristics (a) to (c) of the secondary battery obtained as mentioned above are evaluated in a manner similar to Example 1.

Example 9

The cathode active material is obtained in a manner similar to Example 1 except that when manganese carbonate $MnCO_3$ is mixed, manganese carbonate $MnCO_3$ is basis-weighted and mixed so that an atom ratio of cobalt Co:manganese Mn=100:5.

The powder of the obtained cathode active material is observed by the SEM/EDX, so that it has been confirmed that manganese Mn has uniformly been distributed on the surface of the composite oxide particle containing cobalt Co and fluorine F has been dotted on the surface of the composite oxide particle.

With respect to the powder, the powder XRD pattern using CuKα of the long wavelength is measured, so that the diffraction peak of LiF has been confirmed in addition to the diffraction peak corresponding to $LiCoO_2$ having the stratified rock-salt structure.

Further, an element ratio of the surface of the cathode active material particle is measured by the XPS, so that $A/(M+M'+X+A)=Co/(Mn+Li+F+Co)=0.11$ is obtained.

The battery characteristics (a) to (c) of the secondary battery obtained as mentioned above are evaluated in a manner similar to Example 1.

Example 10

The cathode active material is obtained in a manner similar to Example 1 except that when manganese carbonate $MnCO_3$ is mixed, manganese carbonate $MnCO_3$ is basis-weighted and mixed so that an atom ratio of cobalt Co:manganese Mn=100:10.

The powder of the obtained cathode active material is observed by the SEM/EDX, so that it has been confirmed that manganese Mn has uniformly been distributed on the surface of the composite oxide particle containing cobalt Co and fluorine F has been dotted on the surface of the composite oxide particle.

With respect to the powder, the powder XRD pattern using CuKα of the long wavelength is measured, so that the diffraction peak of LiF has been confirmed in addition to the diffraction peak corresponding to $LiCoO_2$ having the stratified rock-salt structure.

Further, an element ratio of the surface of the cathode active material particle is measured by the XPS, so that $A/(M+M'+X+A)=Co/(Mn+Li+F+Co)=0.04$ is obtained.

The battery characteristics (a) to (c) of the secondary battery obtained as mentioned above are evaluated in a manner similar to Example 1.

Example 11

The cathode active material is obtained in a manner similar to Example 1 except that magnesium fluoride $MgF_2$ has been mixed in place of lithium fluoride LiF.

The powder of the obtained cathode active material is observed by the SEM/EDX, so that it has been confirmed that manganese Mn has uniformly been distributed on the surface of the composite oxide particle containing cobalt Co and fluorine F has been dotted on the surface of the composite oxide particle.

With respect to the powder, the powder XRD pattern using CuKα of the long wavelength is measured, so that the diffraction peak of $MgF_2$ has been confirmed in addition to the diffraction peak corresponding to $LiCoO_2$ having the stratified rock-salt structure.

Further, an element ratio of the surface of the cathode active material particle is measured by the XPS, so that $A/(M+M'+X+A)=Co/(Mn+Mg+F+Co)=0.28$ is obtained.

The battery characteristics (a) to (c) of the secondary battery obtained as mentioned above are evaluated in a manner similar to Example 1.

Example 12

The cathode active material is obtained in a manner similar to Example 1 except that aluminum fluoride $AlF_3$ has been mixed in place of lithium fluoride LiF.

The powder of the obtained cathode active material is observed by the SEM/EDX, so that it has been confirmed that manganese Mn has uniformly been distributed on the surface of the composite oxide particle containing cobalt Co and fluorine F has been dotted on the surface of the composite oxide particle.

With respect to the powder, the powder XRD pattern using CuKα of the long wavelength is measured, so that the diffraction peak of $AlF_3$ has been confirmed in addition to the diffraction peak corresponding to $LiCoO_2$ having the stratified rock-salt structure.

Further, an element ratio of the surface of the cathode active material particle is measured by the XPS, so that $A/(M+M'+X+A)=Co/(Mn+Ak+F+Co)=0.31$ is obtained.

The battery characteristics (a) to (c) of the secondary battery obtained as mentioned above are evaluated in a manner similar to Example 1.

Example 13

The cathode active material is obtained in a manner similar to Example 1 except that magnesium carbonate $MgCO_3$ has been mixed in place of manganese carbonate $MnCO_3$.

The powder of the obtained cathode active material is observed by the SEM/EDX, so that it has been confirmed that magnesium Mg has uniformly been distributed on the surface of the composite oxide particle containing cobalt Co and fluorine F has been dotted on the surface of the composite oxide particle.

With respect to the powder, the powder XRD pattern using CuKα of the long wavelength is measured, so that the diffraction peak of LiF has been confirmed in addition to the diffraction peak corresponding to $LiCoO_2$ having the stratified rock-salt structure.

Further, an element ratio of the surface of the cathode active material particle is measured by the XPS, so that $A/(M+M'+X+A)=Co/(Mg+Li+F+Co)=0.36$ is obtained.

The battery characteristics (a) to (c) of the secondary battery obtained as mentioned above are evaluated in a manner similar to Example 1.

Example 14

The cathode active material is obtained in a manner similar to Example 1 except that aluminum hydroxide $Al(OH)_3$ has been mixed in place of manganese carbonate $MnCO_3$.

The powder of the obtained cathode active material is observed by the SEM/EDX, so that it has been confirmed that aluminum Al has uniformly been distributed on the surface of the composite oxide particle containing cobalt Co and fluorine F has been dotted on the surface of the composite oxide particle.

With respect to the powder, the powder XRD pattern using CuKα of the long wavelength is measured, so that the diffraction peak of LiF has been confirmed in addition to the diffraction peak corresponding to LiCoO$_2$ having the stratified rock-salt structure.

Further, an element ratio of the surface of the cathode active material particle is measured by the XPS, so that A/(M+M'+X+A)=Co/(Al+Li+F+Co)=0.23 is obtained.

The battery characteristics (a) to (c) of the secondary battery obtained as mentioned above are evaluated in a manner similar to Example 1.

Example 15

The cathode active material is obtained in a manner similar to Example 1 except that bismuth oxide Bi$_2$O$_3$ has been mixed in place of manganese carbonate MnCO$_3$.

The powder of the obtained cathode active material is observed by the SEM/EDX, so that it has been confirmed that bismuth Bi has uniformly been distributed on the surface of the composite oxide particle containing cobalt Co and fluorine F has been dotted on the surface of the composite oxide particle.

With respect to the powder, the powder XRD pattern using CuKα of the long wavelength is measured, so that the diffraction peak of LiF has been confirmed in addition to the diffraction peak corresponding to LiCoO$_2$ having the stratified rock-salt structure.

Further, an element ratio of the surface of the cathode active material particle is measured by the XPS, so that A/(M+M'+X+A)=Co/(Bi+Li+F+Co)=0.42 is obtained.

The battery characteristics (a) to (c) of the secondary battery obtained as mentioned above are evaluated in a manner similar to Example 1.

Example 16

The cathode active material is obtained in a manner similar to Example 1 except that molybdenum oxide MoO$_3$ has been mixed in place of manganese carbonate MnCO$_3$.

The powder of the obtained cathode active material is observed by the SEM/EDX, so that it has been confirmed that molybdenum Mo has uniformly been distributed on the surface of the composite oxide particle containing cobalt Co and fluorine F has been dotted on the surface of the composite oxide particle.

With respect to the powder, the powder XRD pattern using CuKα of the long wavelength is measured, so that the diffraction peak of LiF has been confirmed in addition to the diffraction peak corresponding to LiCoO$_2$ having the stratified rock-salt structure.

Further, an element ratio of the surface of the cathode active material particle is measured by the XPS, so that A/(M+M'+X+A)=Co/(Mo+Li+F+Co)=0.39 is obtained.

The battery characteristics (a) to (c) of the secondary battery obtained as mentioned above are evaluated in a manner similar to Example 1.

Example 17

The cathode active material is obtained in a manner similar to Example 1 except that yttrium oxide Y$_2$O$_3$ has been mixed in place of manganese carbonate MnCO$_3$.

The powder of the obtained cathode active material is observed by the SEM/EDX, so that it has been confirmed that yttrium Y has uniformly been distributed on the surface of the composite oxide particle containing cobalt Co and fluorine F has been dotted on the surface of the composite oxide particle.

With respect to the powder, the powder XRD pattern using CuKα of the long wavelength is measured, so that the diffraction peak of LiF has been confirmed in addition to the diffraction peak corresponding to LiCoO$_2$ having the stratified rock-salt structure.

Further, an element ratio of the surface of the cathode active material particle is measured by the XPS, so that A/(M+M'+X+A)=Co/(Y+Li+F+Co)=0.51 is obtained.

The battery characteristics (a) to (c) of the secondary battery obtained as mentioned above are evaluated in a manner similar to Example 1.

Example 18

The cathode active material is obtained in a manner similar to Example 1 except that when manganese carbonate MnCO$_3$ is mixed, manganese carbonate MnCO$_3$ is basis-weighted and mixed so that an atom ratio of cobalt Co:manganese Mn=100:0.1, and when lithium fluoride LiF is mixed, lithium fluoride LiF is basis-weighted and mixed so that an atom ratio of cobalt Co:fluorine F=100:1.

The powder of the obtained cathode active material is observed by the SEM/EDX, so that it has been confirmed that manganese Mn has uniformly been distributed on the surface of the composite oxide particle containing cobalt Co and fluorine F has been dotted on the surface of the composite oxide particle.

With respect to the powder, the powder XRD pattern using CuKα of the long wavelength is measured, so that the diffraction peak of LiF has been confirmed in addition to the diffraction peak corresponding to LiCoO$_2$ having the stratified rock-salt structure.

Further, an element ratio of the surface of the cathode active material particle is measured by the XPS, so that A/(M+M'+X+A)=Co/(Mn+Li+F+Co)=0.87 is obtained.

The battery characteristics (a) to (c) of the secondary battery obtained as mentioned above are evaluated in a manner similar to Example 1.

Example 19

The cathode active material is obtained in a manner similar to Example 1 except that when manganese carbonate MnCO$_3$ is mixed, manganese carbonate MnCO$_3$ is basis-weighted and mixed so that an atom ratio of cobalt Co: manganese Mn=100:15.

The powder of the obtained cathode active material is observed by the SEM/EDX, so that it has been confirmed that manganese Mn has uniformly been distributed on the surface of the composite oxide particle containing cobalt Co and fluorine F has been dotted on the surface of the composite oxide particle.

With respect to the powder, the powder XRD pattern using CuKα of the long wavelength is measured, so that the diffraction peak of LiF has been confirmed in addition to the diffraction peak corresponding to LiCoO$_2$ having the stratified rock-salt structure.

Further, an element ratio of the surface of the cathode active material particle is measured by the XPS, so that A/(M+M'+X+A)=Co/(Mn+Li+F+Co)=0.02 is obtained.

The battery characteristics (a) to (c) of the secondary battery obtained as mentioned above are evaluated in a manner similar to Example 1.

<Comparison 1>

The battery characteristics (a) to (c) are evaluated in a manner similar to Example 1 except that lithium cobalt acid $LiCoO_2$ which is not subjected to the coating process is used as a cathode active material and the charge voltage is set to 4.20V.

<Comparison 2>

The battery characteristics (a) to (c) are evaluated in a manner similar to Example 1 except that lithium cobalt acid $LiCoO_2$ which is not subjected to the coating process is used as a cathode active material and the charge voltage is set to 4.35V.

<Comparison 3>

The battery characteristics (a) to (c) are evaluated in a manner similar to Example 1 except that lithium cobalt acid $LiCoO_2$ which is not subjected to the coating process is used as a cathode active material.

<Comparison 4>

The battery characteristics (a) to (c) are evaluated in a manner similar to Example 1 except that lithium cobalt acid $LiCoO_2$ which is not subjected to the coating process is used as a cathode active material and the charge voltage is set to 4.50V.

<Comparison 5>

The cathode active material is obtained in a manner similar to Example 1 except that after the coating process of manganese Mn was executed, the coating process of lithium fluoride LiF is not executed.

The powder of the obtained cathode active material is observed by the SEM/EDX, so that it has been confirmed that manganese Mn has uniformly been distributed on the surface of the composite oxide particle containing cobalt Co.

With respect to the powder, the powder XRD pattern using CuKα of the long wavelength is measured, so that only the diffraction peak corresponding to $LiCoO_2$ having the stratified rock-salt structure has been confirmed.

Further, an element ratio of the surface of the cathode active material particle is measured by the XPS, so that fluorine F is not confirmed and A/(M+M'+X+A)=Co/(Mn+Li+Co)=0.24 is obtained.

The battery characteristics (a) to (c) of the secondary battery obtained as mentioned above are evaluated in a manner similar to Example 1.

<Comparison 6>

The cathode active material is obtained in a manner similar to Example 1 except that the coating process of manganese Mn is not executed but only the coating process of lithium fluoride LiF is executed.

The powder of the obtained cathode active material is observed by the SEM/EDX, so that it has been confirmed that fluorine F has uniformly been dotted on the surface of the composite oxide particle containing cobalt Co.

With respect to the powder, the powder XRD pattern using CuKα of the long wavelength is measured, so that the diffraction peak of LiF has been confirmed in addition to the diffraction peak corresponding to $LiCoO_2$ having the stratified rock-salt structure.

Further, an element ratio of the surface of the cathode active material particle is measured by the XPS, so that manganese Mn is not confirmed and A/(M+M'+X+A)=Co/(Li+F+Co)=0.71 is obtained.

The battery characteristics (a) to (c) of the secondary battery obtained as mentioned above are evaluated in a manner similar to Example 1.

<Comparison 7>

The cathode active material is obtained in a manner similar to Example 1 except that after the coating process of manganese Mn was executed, lithium fluoride LiF is mixed and a process is executed for one hour by using the mechanochemical apparatus.

The powder of the obtained cathode active material is observed by the SEM/EDX, so that it has been confirmed that manganese Mn and fluorine F have uniformly been distributed on the surface of the composite oxide particle containing cobalt Co, respectively.

With respect to the powder, the powder XRD pattern using CuKα of the long wavelength is measured, so that only the diffraction peak corresponding to $LiCoO_2$ having the stratified rock-salt structure has been confirmed.

Further, an element ratio of the surface of the cathode active material particle is measured by the XPS, so that A/(M+M'+X+A)=Co/(Mn+Li+F+Co)=0.52 is obtained.

The battery characteristics (a) to (c) of the secondary battery obtained as mentioned above are evaluated in a manner similar to Example 1.

<Comparison 8>

The cathode active material is obtained in a manner similar to Example 1 except that the coating process of manganese Mn is not executed but only the coating process of aluminum oxide $Al_2O_3$ in place of lithium fluoride LiF is executed.

The powder of the obtained cathode active material is observed by the SEM/EDX, so that it has been confirmed that aluminum Al has uniformly been dotted on the surface of the composite oxide particle containing cobalt Co.

With respect to the powder, the powder XRD pattern using CuKα of the long wavelength is measured, so that the diffraction peak of $Al_2O_3$ has been confirmed in addition to the diffraction peak corresponding to $LiCoO_2$ having the stratified rock-salt structure.

Further, an element ratio of the surface of the cathode active material particle is measured by the XPS, so that manganese Mn is not confirmed and A/(M+M'+X+A)=Co/(Al+F+Co)=0.66 is obtained.

The battery characteristics (a) to (c) of the secondary battery obtained as mentioned above are evaluated in a manner similar to Example 1.

<Comparison 9>

The battery characteristics (a) to (c) are evaluated in a manner similar to Example 1 except that the composite oxide particle ($LiCu_{0.98}Al_{0.01}Mg_{0.01}O_2$) which is not subjected to the coating process is used as a cathode active material.

<Comparison 10>

The battery characteristics (a) to (c) are evaluated in a manner similar to Example 1 except that the composite oxide particle ($LiNi_{0.80}Co_{0.20}O_2$) which is not subjected to the coating process is used as a cathode active material.

Evaluation results of the battery characteristics are shown in the following Table 1.

TABLE 1

| | MOTHER PARTICLE | COATING MATERIAL M | | | COATING MATERIAL M'X | | |
|---|---|---|---|---|---|---|---|
| | | M | COATING AMOUNT [%] | M DISTRIBUTION STATE | M'X | COATING AMOUNT [%] | X DISTRIBUTION STATE |
| EXAMPLE 1 | $LiCoO_2$ | Mn | 2.0 | UNIFORM | LiF | 2.0 | DOTTED |
| EXAMPLE 2 | $LiCo_{0.98}Al_{0.01}Mg_{0.01}O_2$ | Mn | 2.0 | UNIFORM | LiF | 2.0 | DOTTED |
| EXAMPLE 3 | $LiCo_{0.98}Zr_{0.02}O_2$ | Mn | 2.0 | UNIFORM | LiF | 2.0 | DOTTED |
| EXAMPLE 4 | $LiNi_{0.80}Co_{0.20}O_2$ | Mn | 2.0 | UNIFORM | LiF | 2.0 | DOTTED |
| EXAMPLE 5 | $LiCoO_2$ | Mn | 2.0 | UNIFORM | LiF | 2.0 | DOTTED |
| EXAMPLE 6 | $LiCoO_2$ | Mn | 2.0 | UNIFORM | LiF | 2.0 | DOTTED |
| EXAMPLE 7 | $LiCoO_2$ | Mn | 2.0 | UNIFORM | LiF | 2.0 | DOTTED |
| EXAMPLE 8 | $LiCoO_2$ | Mn | 0.5 | UNIFORM | LiF | 1.0 | DOTTED |
| EXAMPLE 9 | $LiCoO_2$ | Mn | 5.0 | UNIFORM | LiF | 2.0 | DOTTED |
| EXAMPLE 10 | $LiCoO_2$ | Mn | 10.0 | UNIFORM | LiF | 2.0 | DOTTED |
| EXAMPLE 11 | $LiCoO_2$ | Mn | 2.0 | UNIFORM | $MgF_2$ | 2.0 | DOTTED |
| EXAMPLE 12 | $LiCoO_2$ | Mn | 2.0 | UNIFORM | $AlF_3$ | 2.0 | DOTTED |
| EXAMPLE 13 | $LiCoO_2$ | Mg | 2.0 | UNIFORM | LiF | 2.0 | DOTTED |
| EXAMPLE 14 | $LiCoO_2$ | Al | 2.0 | UNIFORM | LiF | 2.0 | DOTTED |
| EXAMPLE 15 | $LiCoO_2$ | Bi | 2.0 | UNIFORM | LiF | 2.0 | DOTTED |
| EXAMPLE 16 | $LiCoO_2$ | Mo | 2.0 | UNIFORM | LiF | 2.0 | DOTTED |
| EXAMPLE 17 | $LiCoO_2$ | Y | 2.0 | UNIFORM | LiF | 2.0 | DOTTED |
| EXAMPLE 18 | $LiCoO_2$ | Mn | 0.1 | UNIFORM | LiF | 1.0 | DOTTED |
| EXAMPLE 19 | $LiCoO_2$ | Mn | 15 | UNIFORM | LiF | 2.0 | DOTTED |
| COMPARISON 1 | $LiCoO_2$ | — | — | — | — | — | — |
| COMPARISON 2 | $LiCoO_2$ | — | — | — | — | — | — |
| COMPARISON 3 | $LiCoO_2$ | — | — | — | — | — | — |
| COMPARISON 4 | $LiCoO_2$ | — | — | — | — | — | — |
| COMPARISON 5 | $LiCoO_2$ | Mn | 2.0 | UNIFORM | — | — | — |
| COMPARISON 6 | $LiCoO_2$ | — | — | — | LiF | 2.0 | DOTTED |
| COMPARISON 7 | $LiCoO_2$ | Mn | 2.0 | UNIFORM | LiF | 2.0 | UNIFORM |
| COMPARISON 8 | $LiCoO_2$ | — | — | — | $Al_2O_3$ | 2.0 | DOTTED |
| COMPARISON 9 | $LiCo_{0.98}Al_{0.01}Mg_{0.01}O_2$ | — | — | — | — | — | — |
| COMPARISON 10 | $LiNi_{0.80}Co_{0.20}O_2$ | — | — | — | — | — | — |

| | $\dfrac{A}{M + M' + X + A}$ | INITIAL CAPACITANCE [Wh] | CAPACITANCE MAINTAINING RATIO [%] | INTERNAL RESISTANCE [Ω] | CHARGE VOLTAGE [V] |
|---|---|---|---|---|---|
| EXAMPLE 1 | 0.26 | 9.2 | 84 | 61 | 4.40 |
| EXAMPLE 2 | 0.32 | 9.3 | 88 | 60 | 4.40 |
| EXAMPLE 3 | 0.31 | 9.3 | 86 | 62 | 4.40 |
| EXAMPLE 4 | 0.29 | 9.0 | 85 | 59 | 4.40 |
| EXAMPLE 5 | 0.26 | 8.0 | 92 | 57 | 4.20 |
| EXAMPLE 6 | 0.26 | 8.8 | 87 | 60 | 4.35 |
| EXAMPLE 7 | 0.26 | 9.5 | 80 | 63 | 4.50 |
| EXAMPLE 8 | 0.76 | 9.3 | 78 | 64 | 4.40 |
| EXAMPLE 9 | 0.11 | 8.9 | 87 | 65 | 4.40 |
| EXAMPLE 10 | 0.04 | 8.2 | 88 | 68 | 4.40 |
| EXAMPLE 11 | 0.28 | 9.3 | 83 | 62 | 4.40 |
| EXAMPLE 12 | 0.31 | 9.2 | 85 | 60 | 4.40 |
| EXAMPLE 13 | 0.36 | 9.0 | 81 | 62 | 4.40 |
| EXAMPLE 14 | 0.23 | 9.3 | 82 | 61 | 4.40 |
| EXAMPLE 15 | 0.42 | 9.1 | 80 | 63 | 4.40 |
| EXAMPLE 16 | 0.39 | 9.3 | 83 | 64 | 4.40 |
| EXAMPLE 17 | 0.51 | 9.2 | 85 | 61 | 4.40 |
| EXAMPLE 18 | 0.87 | 9.0 | 52 | 95 | 4.40 |
| EXAMPLE 19 | 0.02 | 8.0 | 64 | 83 | 4.40 |
| COMPARISON 1 | — | 7.9 | 76 | 72 | 4.20 |
| COMPARISON 2 | — | 8.6 | 56 | 81 | 4.35 |
| COMPARISON 3 | — | 9.0 | 44 | 101 | 4.40 |
| COMPARISON 4 | — | 9.1 | 28 | 137 | 4.50 |
| COMPARISON 5 | 0.24 | 9.0 | 52 | 89 | 4.40 |
| COMPARISON 6 | 0.71 | 9.1 | 48 | 87 | 4.40 |
| COMPARISON 7 | 0.52 | 8.9 | 43 | 94 | 4.40 |
| COMPARISON 8 | 0.66 | 8.7 | 51 | 113 | 4.40 |
| COMPARISON 9 | — | 9.1 | 48 | 98 | 4.40 |
| COMPARISON 10 | — | 9.0 | 51 | 87 | 4.40 |

As will be understood by comparing Example 1 and Comparison 3, since the coating layer containing the element M and the halogen element X is provided for the composite oxide particle, the high capacitance and the excellent charge/discharge cycle characteristics are obtained and, further, an increase in internal resistance can be suppressed.

From Examples 1 and 19 and Comparison 7, it will be understood that since not only the coating layer containing the element M and the halogen element X is provided for the composite oxide particle but also the element M and the halogen element X have the different distribution states, that is, only the element M is uniformly distributed and the halogen element X is dotted, the capacitance maintaining ratio and the internal resistance can be further improved. From Comparisons 5, 6, and 8, it will be understood that if the particle surface is merely coated only with either the element M or the halogen element X, it is difficult to improve the battery performance.

From the comparison results of Example 5 and Comparison 1, Example 6 and Comparison 2, and Example 7 and Comparison 4, it will be understood that even if the charge voltage of the secondary battery is changed, similar effects are obtained.

As will be understood from Examples 2 to 4 and Comparisons 9 and 10, even if a composite oxide particle other than lithium cobalt acid $LiCoO_2$ is used as a composite oxide particle serving as a mother particle, the capacitance maintaining ratio and the internal resistance can be improved without reducing the initial capacitance.

As will be understood from Examples 13 to 17, even if magnesium Mg, aluminum Al, bismuth Bi, molybdenum Mo, and yttrium Y other than manganese Mn are used as an element M, similar effects can be obtained. It is preferable that at least a part of the halogen element X is dotted on the surface in a state of a compound expressed in a form of $M'_aX_b$, even if magnesium fluoride $MgF_2$ and aluminum fluoride $AlF_3$ other than lithium fluoride LiF are used as such a compound, similar effects can be obtained.

Further, as will be understood from Examples 8 and 18, when the element ratio A/(M+M'+X+A) of the element A, element M, element M', and halogen element X in the surface of the cathode active material is less than 0.8, the capacitance maintaining ratio and the internal resistance can be further improved. It will be understood from Examples 9 and 19 that when the element ratio A/(M+M'+X+A) exceeds 0.1, the capacitance maintaining ratio and the internal resistance can be further improved without reducing the initial capacitance.

Although the present application has been described above by mentioning the embodiments and Examples, the present application is not limited to the foregoing embodiments and Examples but many various modifications are possible. For example, although the foregoing embodiments and Examples have been described with respect to the secondary battery having the wound structure, the present application can be also similarly applied to a secondary battery having a structure in which the cathode and anode are folded or piled. In addition, the present application can be also applied to a secondary battery of what is called a coin type, a button type, a rectangular type, a laminate film type, or the like.

Although the secondary battery using the non-aqueous electrolytic solution or gel-like electrolyte as an electrolyte has been described in the foregoing embodiments, the present application can be also similarly applied to a secondary battery using a solid-state electrolyte. As a solid-state electrolyte, any of an inorganic solid-state electrolyte and a high polymer solid-state electrolyte can be used so long as it is a material having a lithium ion conductivity. As an inorganic solid-state electrolyte, for example, lithium nitride, lithium iodide, or the like can be mentioned. The high polymer solid-state electrolyte is made of electrolytic salt and a high polymer compound which dissolves it. As a high polymer compound, for example, an ether system high polymer such as poly (ethylene oxide), cross-linked polyethylene oxide, or the like, a poly (methacrylate) ester system, an acrylate system, or the like can be solely used or can be copolymerized or mixed into molecules and used.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A cathode active material comprising:
   a composite oxide particle containing at least lithium and one or a plurality of transition metals A; and
   a coating layer provided on at least a part of said composite oxide particle, and a dotted compound at the surface of said composite oxide particle,
   wherein the coating layer contains:
   at least one kind of element M differing from said main transition metal element A forming said composite oxide particle and selected from Groups 2 to 16 of the periodic table, and the
   dotted compound M'X containing a halogen element X,
   wherein element compositions on the surface of said composite oxide particle having said composite oxide particle and said coating layer lie within a range of 0.03<A/(M+M'+X+A)<0.8 as an atom ratio.

2. The cathode active material according to claim 1, wherein said element M is uniformly distributed on a surface of said composite oxide particle, and said halogen element X is dotted on the surface of said composite oxide particle.

3. The cathode active material according to claim 2, wherein at least a part of said halogen element X exists in a form of a halide of an element M' different from said element M.

4. The cathode active material according to claim 3, wherein the halide of said element M' contains at least lithium fluoride LiF.

5. The cathode active material according to claim 1, wherein said composite oxide particle has a stratified rock-salt structure.

6. The cathode active material according to claim 1, wherein said main transition metal element A contains at least cobalt Co.

7. The cathode active material according to claim 1, wherein element compositions lie within a range of 0<M/(A+M)<0.1 as an atom ratio.

8. The cathode active material according to claim 1, wherein said element M contains at least one kind of element selected from manganese Mn, aluminum Al, magnesium Mg, bismuth Bi, molybdenum Mo, and yttrium Y.

9. A cathode active material comprising:
   a composite oxide particle containing at least lithium and one or a plurality of transition metals A; and
   a coating layer provided on at least a part of said composite oxide particle, and a dotted compound at the surface of said composite oxide particle,
   wherein the coating layer contains:
   at least one kind of element M differing from said main transition metal element forming said composite oxide particle and selected from Groups 2 to 16 of the periodic table, and the
   dotted compound M'X containing a halogen element X,
   wherein element compositions on the surface of said composite oxide particle having said composite oxide particle and said coating layer lie within a range of 0.03<A/(M+M'+X+A)<0.8 as an atom ratio.

10. A non-aqueous electrolyte secondary battery comprising: a cathode having a cathode active material; an anode; a separator; and an electrolyte,
    wherein said cathode contains an active material which comprises
    a composite oxide particle containing at least lithium and one or a plurality of transition metals A; and a coating layer provided on at least a part of said composite oxide particle, and a dotted compound at the surface of said composite oxide particle, wherein the coating layer contains:

at least one kind of element M differing from said main transition metal element forming said composite oxide particle and selected from Groups 2 to 16 of the periodic table, and the dotted compound M'X containing a halogen element X, wherein element compositions on the surface of said composite oxide particle having said composite oxide particle and said coating layer lie within a range of $0.03 < A/(M+M'+X+A) < 0.8$ as an atom ratio.

11. The non-aqueous electrolyte secondary battery according to claim 10, wherein an upper limit charge voltage lies within a range from 4.25V or more to 4.80V or less and a lower limit charge voltage lies within a range from 2.00V or more to 3.30V or less.

12. The cathode active material according to claim 1, wherein a mean diameter of the cathode active material containing the composited oxide particle and the coating layer is within a range of about 2.0 μm to about 50 μm.

13. The cathode active material according to claim 1, wherein the composite oxide particle is a lithium-containing transition metal oxide having a composition shown by Formula 1:

$$Li_pCo_{(1-q)}M_qO_{(2-r)}X_z \qquad \text{Formula 1,}$$

wherein M denotes at least one kind of element selected from Groups 2 to 15 of the periodic table excluding cobalt Co, X indicates at least one kind of elements of Group 16 and elements of Group 17 other than oxygen O, $0 \leq p \leq 1.2$, $0 \leq q \leq 0.3$, $-0.10 \leq r \leq 0.20$, and $0 \leq z \leq 0.1$.

14. The cathode active material according to claim 1, wherein the element M is uniformly distributed on a surface of the composite oxide particle and the element X is unevenly distributed on the surface of the composite oxide particle.

* * * * *